(12) United States Patent
Koike et al.

(10) Patent No.: US 10,176,035 B2
(45) Date of Patent: Jan. 8, 2019

(54) SYSTEM, INFORMATION PROCESSING DEVICE, AND NON-TRANSITORY MEDIUM FOR STORING PROGRAM FOR MIGRATION OF VIRTUAL MACHINE

(71) Applicant: FUJITSU LIMITED, Kawasaki-shi, Kanagawa (JP)

(72) Inventors: Hayato Koike, Kawasaki (JP); Hiroshi Kondou, Yokohama (JP); Takafumi Anraku, Kawasaki (JP); Kenji Gotsubo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 15/216,753

(22) Filed: Jul. 22, 2016

(65) Prior Publication Data

US 2017/0031745 A1    Feb. 2, 2017

(30) Foreign Application Priority Data

Jul. 29, 2015    (JP) .................................. 2015-150165

(51) Int. Cl.
*G06F 11/07*    (2006.01)
*G06F 3/06*    (2006.01)

(52) U.S. Cl.
CPC ............ *G06F 11/079* (2013.01); *G06F 3/065* (2013.01); *G06F 3/0619* (2013.01); *G06F 3/0631* (2013.01); *G06F 3/0647* (2013.01); *G06F 3/0664* (2013.01); *G06F 3/0683* (2013.01); *G06F 11/0709* (2013.01);
(Continued)

(58) Field of Classification Search
CPC ............ G06F 11/0751; G06F 11/0772; G06F 11/079; G06F 11/0793; G06F 11/2035; G06F 11/073; G06F 11/0784; G06F 11/20; G06F 11/2023; G06F 11/2043; G06F 11/2046
See application file for complete search history.

(56) References Cited

U.S. PATENT DOCUMENTS 9,146,769 B1 * 9/2015 Shankar .............. G06F 9/45558
2011/0154104 A1 * 6/2011 Swanson ............. G06F 11/1666
714/6.23

(Continued)

FOREIGN PATENT DOCUMENTS

JP    2010-39987    2/2010
JP    2011-134327    7/2011

*Primary Examiner* — Nadeem Iqbal
(74) *Attorney, Agent, or Firm* — Fujitsu Patent Center

(57) ABSTRACT

A system for migrating a virtual machine includes: a first device; and a second device. The first device notifies the second device of failure information indicating that data transported to the second device includes an error originated from the first device, when the error is detected from a storage area in the first device. The second device writes a second identifier, whose value is different from that of a first identifier, into a memory of the second device while associating the second identifier with a second address, the second address being to serve as a copy destination of data indicated by the failure information, wherein the first identifier indicates that data in the second address includes an error originated from the second device, and the second identifier serves as an identifier indicating that data in the second address includes an error originated from the first device.

15 Claims, 20 Drawing Sheets

(52) U.S. Cl.
CPC ...... *G06F 11/0712* (2013.01); *G06F 11/0751* (2013.01); *G06F 11/0772* (2013.01)

(56) References Cited

U.S. PATENT DOCUMENTS

| | | | |
|---|---|---|---|
| 2012/0159235 A1* | 6/2012 | Suganthi | G06F 11/2028 714/4.11 |
| 2013/0212426 A1 | 8/2013 | Swanson et al. | |
| 2014/0059389 A1* | 2/2014 | Hattori | G06F 11/079 714/37 |
| 2014/0310377 A1* | 10/2014 | Matsuoka | H04L 41/065 709/217 |
| 2015/0309890 A1* | 10/2015 | Pershin | G06F 11/203 714/4.11 |

\* cited by examiner

FIG. 5

| ADDRESS | DATA SIZE | TYPE |
|---|---|---|
| 0x400F4508 | 8 | UE |
| 0x45000380 | 128 | UE |
| 0x450FA340 | 32 | UE |
| 0x6C200FC0 | 64 | UE |

FIG. 20

| CURRENTLY USED | | UNUSED (C) | ,212 UNUSABLE (D) |
|---|---|---|---|
| Read (A) | Write (B) | | | form
SYSTEM, INFORMATION PROCESSING DEVICE, AND NON-TRANSITORY MEDIUM FOR STORING PROGRAM FOR MIGRATION OF VIRTUAL MACHINE

CROSS-REFERENCE TO RELATED APPLICATION

This application is based upon and claims the benefit of priority of the prior Japanese Patent Application No. 2015-150165, filed on Jul. 29, 2015, the entire contents of which are incorporated herein by reference.

FIELD

The embodiments discussed herein are related to a system, an information processing device, and a non-transitory medium for storing program for migrating a virtual machine from a migration source to a migration target.

BACKGROUND

In the past, there has been a technique called migration, in which a virtual machine is migrated between different hardware resources. In addition, there is a correction technique for adding redundant bits to actual data and storing the actual data, thereby restoring, by using the redundant bits, errors if the number of erroneous bits falls within the specific number of bits even in a case where some of bits of the actual data are erroneous at the time of reading the actual data. As a technique of the related art, there is a technique, in which a demand for accessing a memory serving as a duplication destination is retried in a case where an error, which occurs during an access to a first memory serving as a duplication source, is an error that occurs in the first memory and in which a uncorrectable memory error is given notice of in a case where the former error is not an error that occurs in the first memory.

As examples of the related art, Japanese Laid-open Patent Publication No. 2011-134327 and Japanese Laid-open Patent Publication No. 2010-39987 are known.

SUMMARY

According to an aspect of the invention, a system includes a first device configured to cause a virtual machine to operate; and a second device coupled to the first device. The first device is configured to notify the second device of failure information indicating that data transported to the second device includes an error originated from the first device, in a case where the error is detected from a storage area in the first device, at the time of migration of the virtual machine to the second device. The second device is configured to write, when receiving the failure information from the first device, a second identifier, whose value is different from that of a first identifier, into a memory of the second device while associating the second identifier with a second address of the memory in the second device, the second address being used as a copy destination of data indicated by the failure information. The first identifier is used as an identifier indicating that data in the second address includes an error originated from the second device. The second identifier is used as an identifier indicating that data in the second address includes an error originated from the first device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory diagram illustrating an example of failure information;

FIG. 20 is an explanatory diagram illustrating whether or not to allow an operation of a domain to be continued for each of memory usage states.

DESCRIPTION OF EMBODIMENTS

However, in the related art, in a case where, in a device serving as a migration source of a virtual machine, an error difficult to error-correct is detected from information of the virtual machine serving as a migration target, it becomes practically difficult to continue migration. It is difficult to restore, for example, the error difficult to error-correct to original data. Therefore, as a result of the fact that the virtual machine references erroneous data different from the original data in a device serving as a migration destination, a trouble such as data corruption may occur. Accordingly, if the error difficult to error-correct is detected, the migration turns out to be abnormally terminated in order to preserve data.

As one aspect of the present embodiment, provided are solutions for being able to perform, in a device serving as a migration destination of a virtual machine while continuing migration, an operation discriminated from an operation for an error that is difficult to error-correct and that occurs in the device serving as the migration destination.

Hereinafter, disclosed embodiments of the system, information processing device, and a non-transitory medium for storing a program for migration of a virtual machine will be described in detail with reference to drawings. The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Description of First Embodiment

Figure 1:
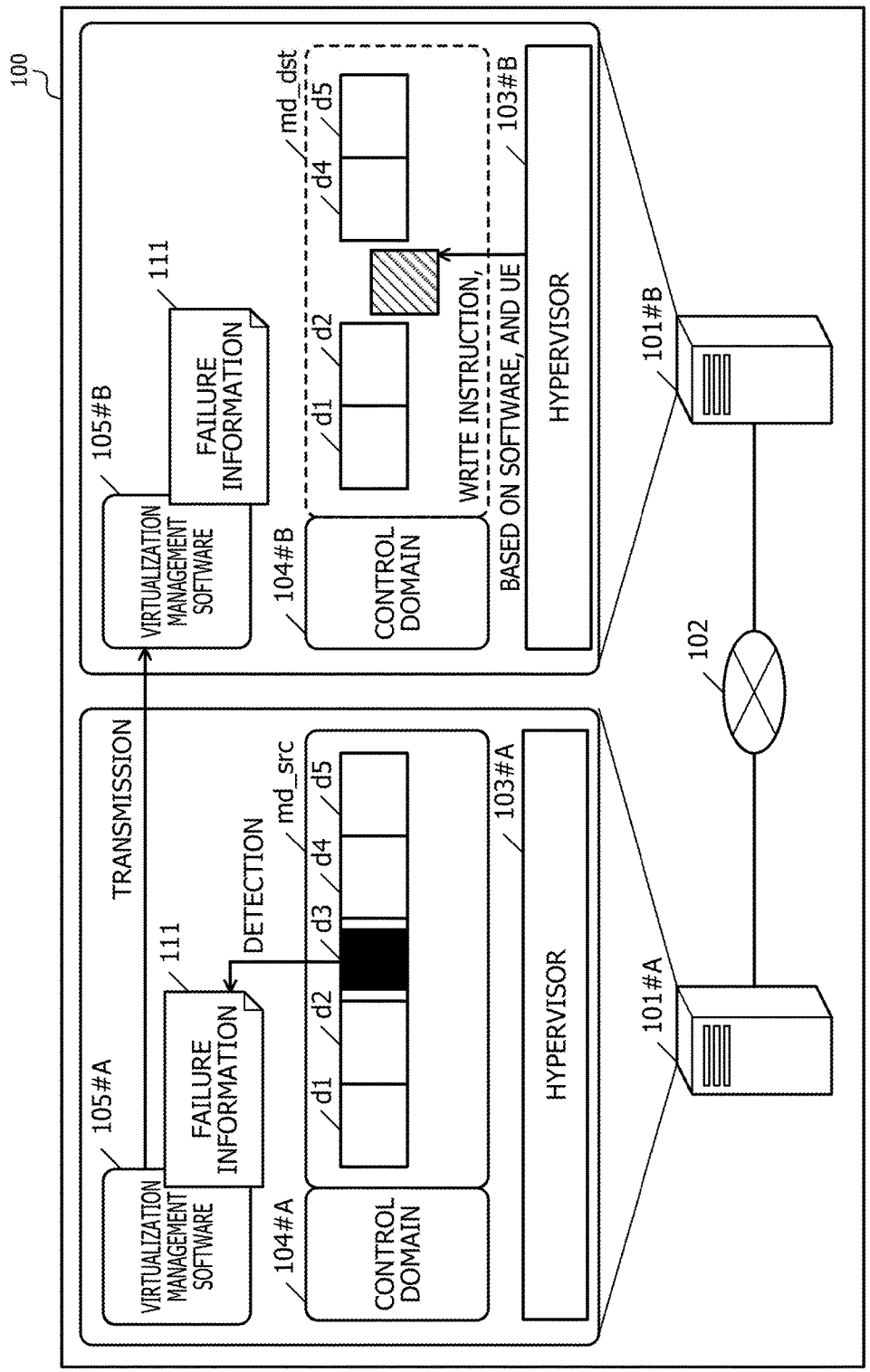
FIG. 1 is an explanatory diagram illustrating an example of an operation of a system according to a first embodiment.

FIG. 1 is an explanatory diagram illustrating an example of an operation of a system 100 according to a first embodiment. In the first embodiment, migration that is an operation for migrating a virtual machine to a different device will be described. Information processing devices 101#A and 101#B included in the system 100 are computers that each control a virtual machine. The information processing devices 101#A and 101#B are coupled to each other by a network 102 such as a local area network (LAN), a wide area network (WAN), or the Internet. Here, in the following illustrations and descriptions, a part whose symbol is assigned with "#A" is a part related to the information processing device 101#A, and a part whose symbol is assigned with "#B" is a part related to the information processing device 101#B.

Specifically, the information processing devices 101#A and 101#B each manage a central processing unit (CPU) and a volatile memory that are to serve as hardware resources of a virtual machine and that are to be allocated to the virtual machine, thereby providing the CPU and the volatile memory to a user who uses the virtual machine. Each of the information processing devices 101#A and 101#B is, for example, a server.

The virtual machine is a computer system virtually created by using hardware resources. The virtual machine may be any one of virtually created computer systems, may be, for example, a server that provides services and data to another computer, and may be a computer provided with services and data by a server. Hereinafter, the virtual machine is called a "domain". Hardware resources that create a domain may be hardware of the information processing devices 101#A and 101#B and may be hardware of another device able to be coupled to the information processing devices 101. In the following description, it is assumed that the hardware resources that create a domain are hardware of the information processing devices 101#A and 101#B.

As a program for controlling a domain, there is a hypervisor. The hypervisor has a function of directly controlling hardware and is a program for providing a virtualized machine architecture in a firmware layer.

Here, as a technique related to a domain, there is a technique called live migration and used for migrating a domain to other hardware while keeping continuing an operation of a domain at work, at the time of maintenance work when a decrease or an increase in the business volume of the domain or a failure of hardware for creating the domain occurs. Hereinafter, the live migration is simply described as "migration". In addition, a domain to serve as a migration source is called a "migration source domain". In addition, a domain to serve as a migration destination is called a "migration destination domain".

In addition, a hypervisor that operates on a device serving as the migration source is called a "migration source hypervisor" in some cases. Furthermore, a hypervisor that operates on a device serving as the migration destination is called a "migration destination hypervisor" in some cases. In the example of FIG. 1, it is assumed that the information processing device 101#A is a device serving as the migration source and the information processing device 101#B is a device serving as the migration destination. Accordingly, in the example of FIG. 1, a hypervisor 103#A that operates on the information processing device 101#A is the migration source hypervisor. In addition, a hypervisor 103#B that operates on the information processing device 101#B is the migration destination hypervisor.

To perform migration, data of a storage area that is allocated to a migration source domain and that is included in a memory of a device serving as a migration source of a domain is read, and the read data is written into a storage area that is allocated to a migration destination domain and that is included in a memory of a device serving as a migration destination. Here, data used by the migration source domain dynamically changes. Data used by, for example, the migration source domain is partly calculated information of an operating system (OS) or application software that operates on the migration source domain.

In addition, in a case of reading the data of a storage area that is allocated to the migration source domain and that is included in the memory of the device serving as a migration source, an error (uncorrectable error: UE) such as an error check and correct (ECC) multibit error, which is difficult to error-correct, is detected in some cases. Here, an error that occurs in a memory will be described. In the memory, various factors may cause an error. In a case where, for example, the memory is physically out of order, an error occurs. Alternatively, in a case where memory cells holding bits are capacitors within the memory, if reading is concentrated, an error is likely to occur. A specific reason is that if reading is performed many times, a capacitor loses electric charge thereof and a bit stored by a memory cell is inverted. In addition, in a case where a memory cell receives an alpha ray or a neutron ray, a bit stored by the memory cell is inverted in some cases. In addition, even if a memory itself normally functions, a path from a CPU to the memory is out of order, thereby causing an error, in some cases.

In addition, when an error to occur in a memory occurs is unclear. Accordingly, the hypervisor detects an error for the first time at the time of migration, in some cases, and the OS has already detected an error before migration, in some cases.

Next, regarding an error, an error (correctable error: CE) able to be error-corrected and the UE will be described. A memory having an ECC function adds redundant bits to actual data and evaluates, by using the actual data and the redundant bits, whether there is an erroneous bit. In addition, in a case where there is an erroneous bit, the memory evaluates a bit corresponding to the erroneous bit within the actual data. As examples of a coding method for redundant bits, there are a BCH code, a Reed-Solomon code, a Huffman code, and so forth. In each of the coding methods, in a case where erroneous bits are detected, if the number of the erroneous bits is less than or equal to the number of bits able to be error-corrected, the erroneous bits become the CEs, and if the number of the erroneous bits exceeds the number of bits able to be error-corrected, the erroneous bits become the UEs. In addition, in each of the coding methods, the number of bits able to be error-corrected is determined based on a relationship between the number of bits of the actual data and the number of bits of the redundant bits.

Here, taking, as an example, a case of a BCH code able to be subjected to double error correction, the coding method will be described. If the actual data and the redundant bits are decoded, it is possible to obtain information of one of the absence of an erroneous bit, a position of one erroneous bit, positions of respective two erroneous bits, and the presence of three or more erroneous bits whose positions are unclear. In this case, in a case of obtaining information of the position of one erroneous bit or the positions of respective two erroneous bits, the CEs turn out to be detected. In addition, in a case of obtaining information of the presence of three or more erroneous bits whose positions are unclear, the UEs turn out to be detected.

However, in a case where, in a device serving as a migration source, a UE is detected from information of a virtual machine serving as a migration target, it is practically difficult to continue migration. It is difficult to restore the UE to, for example, original data. Therefore, as a result of the fact that the virtual machine references erroneous data different from the original data in a device serving as a migration destination, a trouble such as data corruption is caused in some cases. Accordingly, if the UE is detected, the migration turns out to be abnormally terminated in order to preserve data.

In addition, it may be thought that, in a case where the UE is detected in the device serving as a migration source, the erroneous data is set so as to include the UE, thereby avoiding the data corruption while continuing the migration. However, in this case, in the device serving as a migration destination, it is difficult to discriminate a UE, which is caused by an access to the erroneous data, and a UE, which is caused by a failure of the device serving as a migration destination, from each other. Accordingly, in a case where, in the device serving as a migration destination, the UE is caused by an access to the erroneous data, it is erroneously recognized that the device serving as a migration destination is out of order, despite the fact that the device serving as a migration destination is not out of order, and an operation in a case where the device serving as a migration destination is out of order turns out to be performed.

In addition, a memory storing therein the information of the migration source domain is put into one of usage situations illustrated as follows. The first usage situation of the memory is a situation that a domain serving as a migration target is currently used and is to be read after migration. The second usage situation of the memory is a situation that the domain serving as a migration target is currently used and is to be written after migration. The third usage situation of the memory is a situation that the domain serving as a migration target is currently unused and is likely to be used after migration. The fourth usage situation of the memory is a situation that an error previously occurred on the memory and the memory is made unusable. Even if a hypervisor detects a UE at the time of performing migration, it is difficult for the hypervisor to determine one of the above-mentioned four situations, to which an area in which the UE occurs corresponds.

Therefore, in a case where the UE is detected from a storage area that is allocated to the migration source domain and that is included in a memory of the device serving as a migration source, the device serving as a migration source of a domain transmits, to the device serving as a migration destination, failure information indicating a first address at which the UE is detected. Here, the first address is an address of a storage area in which data put into the UE is stored and that is included in a memory of the device serving as a migration source. In addition, the device serving as a migration destination identifies a second address that serves as an address of a memory of the device serving as a migration destination and that serves as a copy destination of the data at the first address indicated by the failure information. In addition, the device serving as a migration destination writes, into a memory of the device serving as a migration destination, a second identifier while associating the second identifier with the identified second address, the second identifier indicating that data at the second address is incorrect owing to the occurrence of the UE in the device serving as a migration source. Here, the second identifier is an identifier indicating a UE and is an identifier different from a first identifier indicating a UE that occurs in the device itself. The first identifier is, for example, an identifier indicating that a failure occurs in a memory, a CPU, or an I/O in the device itself and is a UE. On the other hand, the second identifier is an identifier indicating that an error is not a UE, which occurs in the device itself, and is a UE due to an instruction issued by software. Examples of the first and second identifiers will be described by using FIG. 6.

By using FIG. 1, an operation of the system 100 will be described. In FIG. 1. A migration source domain md_src that currently operates in the information processing device 101#A serving as a device serving as a migration source of a domain is migrated to the information processing device 101#B serving as a device serving as a migration destination. Here, in FIG. 1, as software that operates on the information processing device 101#A, a control domain 104#A, the migration source domain md_src, and virtualization management software 105#A are illustrated. In addition, in FIG. 1, as software that operates on the information processing device 101#B, a control domain 104#B, virtualization management software 105#B, and a migration destination domain md_dst to operate after migration of the migration source domain md_src are illustrated. A state illustrated in FIG. 1 indicates a state before migration, and the migration destination domain md_dst does not operate yet. In FIG. 1, the domain that does not operate yet is indicated by a dotted line.

Each of the control domains 104 is an OS that operates on the corresponding hypervisor 103. Each of the pieces of virtualization management software 105 operates on the corresponding control domain 104, manages resources of the corresponding information processing device 101, and manages a domain in the corresponding information processing device 101. In addition, as one of management operations of a domain, each of the pieces of virtualization management software 105 performs migration between the information processing devices 101.

FIG. 1 indicates that, as information of the migration source domain md_src, scheduled to be transmitted to the information processing device 101#B, there are pieces of information d1 to d5. Here, it is assumed that the information d3 is information including a UE. In FIG. 1, the UE is indicated by blacking-out. If the information d3 is read and the destroyed information d3 is used without change, data corruption is likely to be caused.

Therefore, in a case where, as a result of reading the information d3, it is determined that the UE is detected, the virtualization management software 105#A transmits failure information 111 indicating the first address to the virtualization management software 105#B while defining an address of the information d3 as the first address. As contents of the failure information 111, there are identification information, which indicates that the failure information 111 is the UE, and the first address. Furthermore, as a content of the failure information 111, identification information for identifying a device serving as a migration source in which the UE occurs may be included. FIG. 5 illustrates a specific example of the failure information 111. Here, an execution subject that detects the information d3 serving as information including the UE is the hypervisor 103#A.

The virtualization management software 105#B that receives the failure information 111 issues a UE insertion request to the hypervisor 103#B. The hypervisor 103#B that receives the UE insertion request identifies the second address by converting the first address indicated by the failure information 111. A specific example of conversion will be described by using FIG. 4. In addition, as UE insertion, the hypervisor 103#B writes, into the information processing device 101#B, the second identifier while associating the second identifier with the second address. FIG. 1 indicates that a shaded area is the second identifier.

As a specific example of writing, the hypervisor 103#B writes the second address in a register in which the second identifier is set. In addition, the hypervisor 103#B performs a setting of hardware of the information processing device 101#B so that Trap is raised in a case where the second address is accessed. From this, in a case where an error is detected in a memory access after domain migration and an error detection factor is the above-mentioned setting based on the hypervisor, the information processing device 101#B stores the second identifier in a Trap factor register (an error status register) indicating a factor for Trap. In addition, in the information processing device 101#B, in a case where the second address is read-accessed, the CPU gives notice to software, based on Trap. An operation in a case where a memory is accessed after migration will be described by using FIG. 16.

If, after migration, the second identifier is stored in the error status register in a case of the occurrence of an error or at the time of the occurrence of Trap, the information processing device 101#B is able to determine that the hardware of the device itself is not out of order. In a case where a factor for a write access error is, for example, the above-mentioned setting based on the hypervisor, the information processing device 101#B deletes the second identifier if the second identifier is stored in the error status register. In addition, in a case where Trap is caused by the read access, the information processing device 101#B interrupts software serving as a generation source of the read access if the second identifier is stored in the error status register. If the software serving as the generation source of the read access is, for example, a user program, the information processing device 101#B abnormally terminates the user program serving as the generation source of the read access. In addition, if the software serving as the generation source of the read access is a kernel, the information processing device 101#B generates a kernel panic and forcibly terminates a domain including the kernel. Here, the kernel is a core of software of an OS.

By the failure information 111 being transmitted, the information processing device 101#B is able to determine that the UE is an error, which occurs outside the information processing device 101#B, and is not an error caused by a failure of the hardware of the information processing device 101#B. In addition, by writing the second identifier into a memory of the information processing device 101#B, it is possible to identify an address at which data likely to cause data corruption is stored. Therefore, the information processing device 101#B is able to avoid a problem of the data corruption. In addition, in a case where Trap is caused and the second identifier is stored in the error status register, the information processing device 101#B is able to perform an operation discriminated from an operation for a UE that occurs in the hardware of the information processing device 101#B. Next, an example of a hardware configuration included in the system 100 will be described by using FIG. 2.

Figure 2:
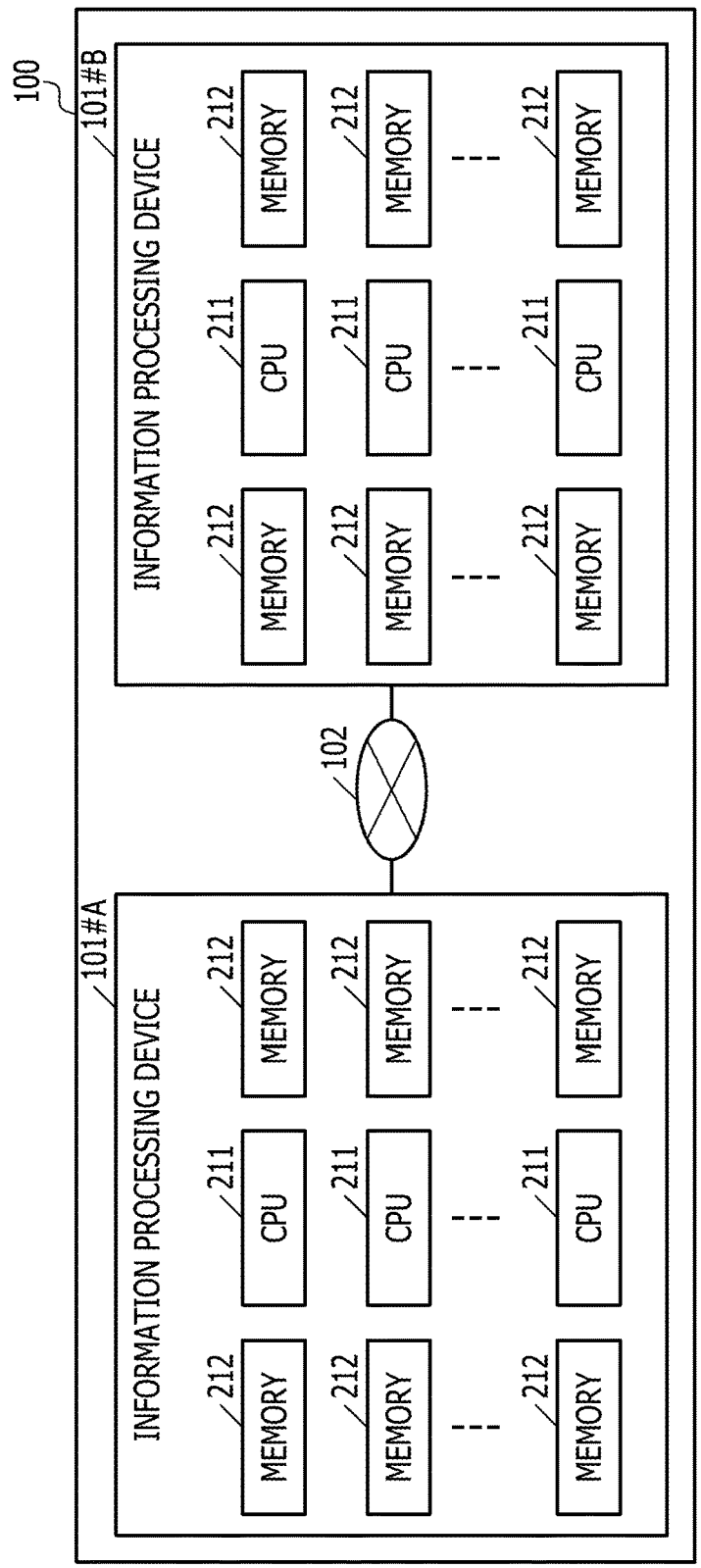
FIG. 2 is an explanatory diagram illustrating an example of hardware included in the system.

FIG. 2 is an explanatory diagram illustrating an example of hardware included in the system 100. The information processing devices 101#A and 101#B have the same hardware. Note that the pieces of hardware included in the information processing devices 101#A and 101#B do not have to be exactly identical to each other. Next, the hardware of each of the information processing devices 101 will be described.

The information processing devices 101 each include one or more CPUs 211 and one or more memories 212. The information processing devices 101#A and 101#B illustrated in FIG. 2 each include the CPUs 211 and the memories 212.

The CPUs 211 is arithmetic processing devices that manage entire control of the corresponding information processing device 101. Here, the CPUs 211 each include one or more cores. In addition, the CPUs 211 include controllers that control accesses to the memories 212. Here, the memory controllers may be located within the corresponding information processing device 101 and be located outside the CPUs 211. In addition, the CPUs 211 each include an input/output (I/O) interface coupled to a LAN.

The memories 212 are volatile memories used as work areas of the CPUs 211. Each of the memories 212 is, for example, a dual inline memory module (DIMM) equipped with an ECC function.

In addition, while not illustrated in FIG. 2, the system 100 includes, as a non-volatile storage device, a hard disk drive (HDD) or a solid state drive (SSD). The system 100 includes one non-volatile storage device, and the information processing devices 101 share and utilize one non-volatile storage device. Alternatively, the information processing devices 101 may each include a non-volatile storage device.

In addition, in a case where an administrator of the system 100 directly operates the information processing devices 101, the information processing devices 101 may each include pieces of hardware such as a display, a keyboard, and a mouse.

Example of Functional Configuration of System 100

Figure 3:
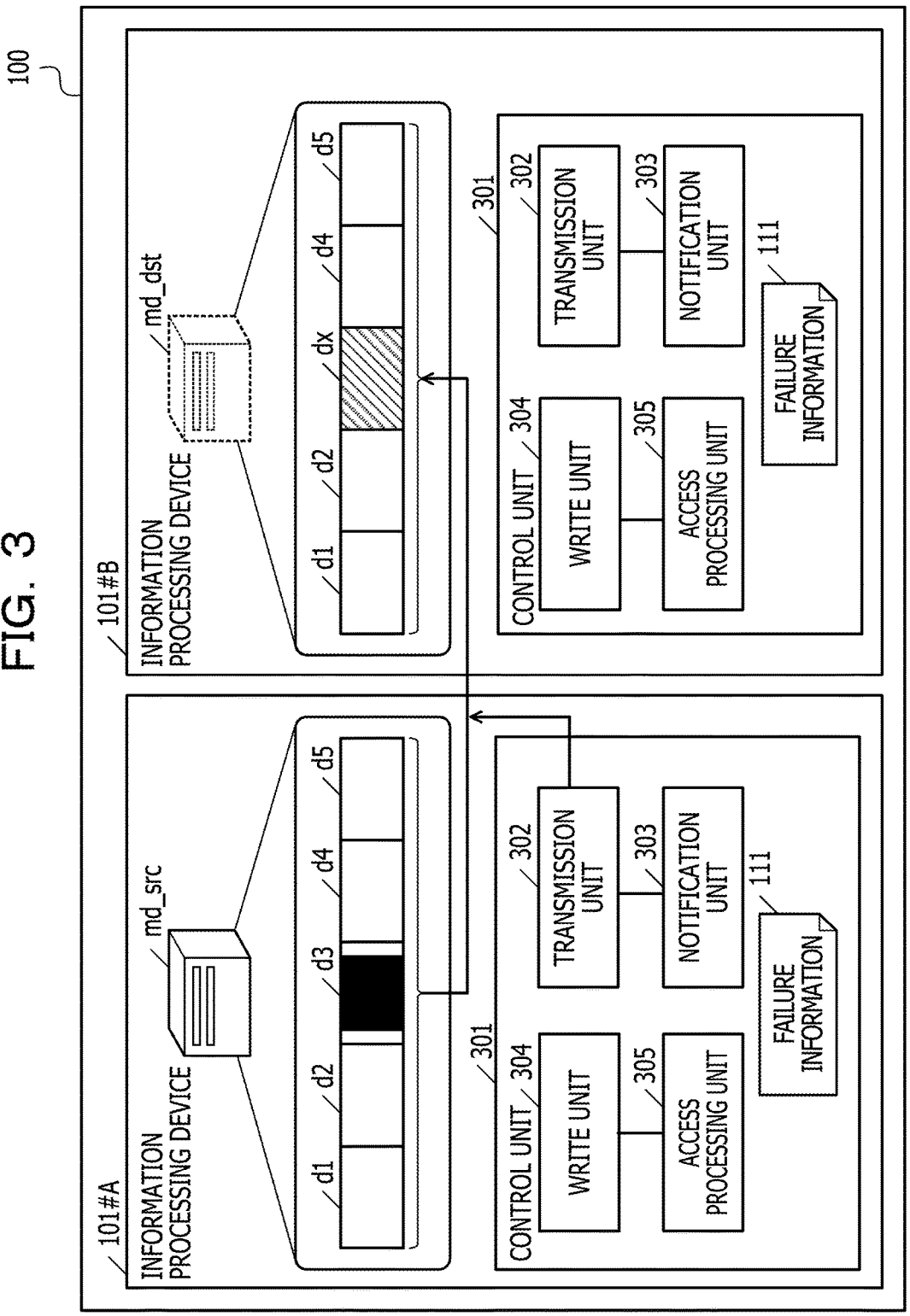
FIG. 3 is a block diagram illustrating an example of a functional configuration of the system.

FIG. 3 is a block diagram illustrating an example of a functional configuration of the system 100. The information processing devices 101#A and 101#B each include a control unit 301. In addition, the control units 301 each include a transmission unit 302, a notification unit 303, a write unit 304, and an access processing unit 305. The CPUs 211 execute a program stored in a storage device, thereby realizing functions of the individual units of the corresponding control unit 301. Here, the transmission unit 302 and the notification unit 303 are functions realized by the corresponding hypervisor 103 and the corresponding virtualization management software 105. In addition, the write unit 304 and the access processing unit 305 are functions realized by the corresponding hypervisor 103. In addition, the storage device is, for example, an HDD, an SSD, or the like. In addition, processing results of the respective units are stored in registers in the CPUs 211, cache memories in the CPUs 211, the memories 212, HDDs, or the like. A state illustrated in FIG. 3 indicates a state before migration, and the migration destination domain md_dst does not operate yet. In FIG. 3, the domain that does not operate is indicated by a dotted line.

The corresponding transmission unit 302 transmits information of the migration source domain md_src to a device serving as a migration destination. The information of the migration source domain md_src is, for example, partly calculated information of software that operates on the migration source domain md_src which operates during migration. In addition, since data at the time of the occurrence of a UE is not correct data during migration, the corresponding transmission unit 302 may transmit temporary information. The temporary information may be any data if the data has the same data size as that of information including a UE. The temporary information is, for example, data whose all bits are "0", data whose all bits are "1", or the like. In addition, the temporary information may include a portion of the corresponding failure information 111. Here, in a case where the temporary information is not transmitted to the device serving as a migration destination, the device serving as a migration destination may write nothing in a storage area indicated by the second address. Here, as described in the explanation of FIG. 1, the first address is an address of a storage area in which data put into the UE is stored and that is included in a memory of the device serving as a migration source. In addition, as described in the explanation of FIG. 1, the second address is an address of a memory of the device serving as a migration destination, the address serving as a copy destination of data at the first address indicated by the failure information 111. In the example of FIG. 3, information dx shaded by diagonal lines is the temporary information corresponding to the information d3 including the UE.

In a case where the information that includes the UE and that is included in the information of the migration source domain md_src is detected, the corresponding notification unit 303 notifies the device serving as a migration destination of the corresponding failure information 111 indicating the first address at which the UE is detected. In addition, the failure information 111 may be used for identifying that the error is an error, which occurs in the device serving as a migration source, and the temporary information may be information indicating that data at a fault location is information unavailable in a migration destination.

The corresponding write unit 304 writes, into a register in the corresponding CPU 211 in a migration destination, the second identifier intentionally regarded as unavailable by software while associating the second identifier with the second address of the device serving as a migration destination, the second identifier serving as a copy destination of data at the first address indicated by the failure information 111. Upon being subjected to writing, the corresponding CPU 211 in a migration destination stores, in a memory, the second identifier intentionally regarded as unavailable by software.

In a case where an access is received after completion of migration and the access is a write access to the second address associated with the second identifier, the CPU 211#B performs overwriting and deletes the second identifier.

In a case of detecting, based on the second identifier after completion of migration, that a read access is generated for the second address, the corresponding access processing unit 305 interrupts software serving as a generation source of the read access. If the generation source of the read access is, for example, a user program, the corresponding access processing unit 305 abnormally terminates the user program. In addition, if the generation source of the read access is a kernel, the corresponding access processing unit 305 puts a domain including the kernel into a panic and forcibly terminates the domain including the kernel.

Figure 4:
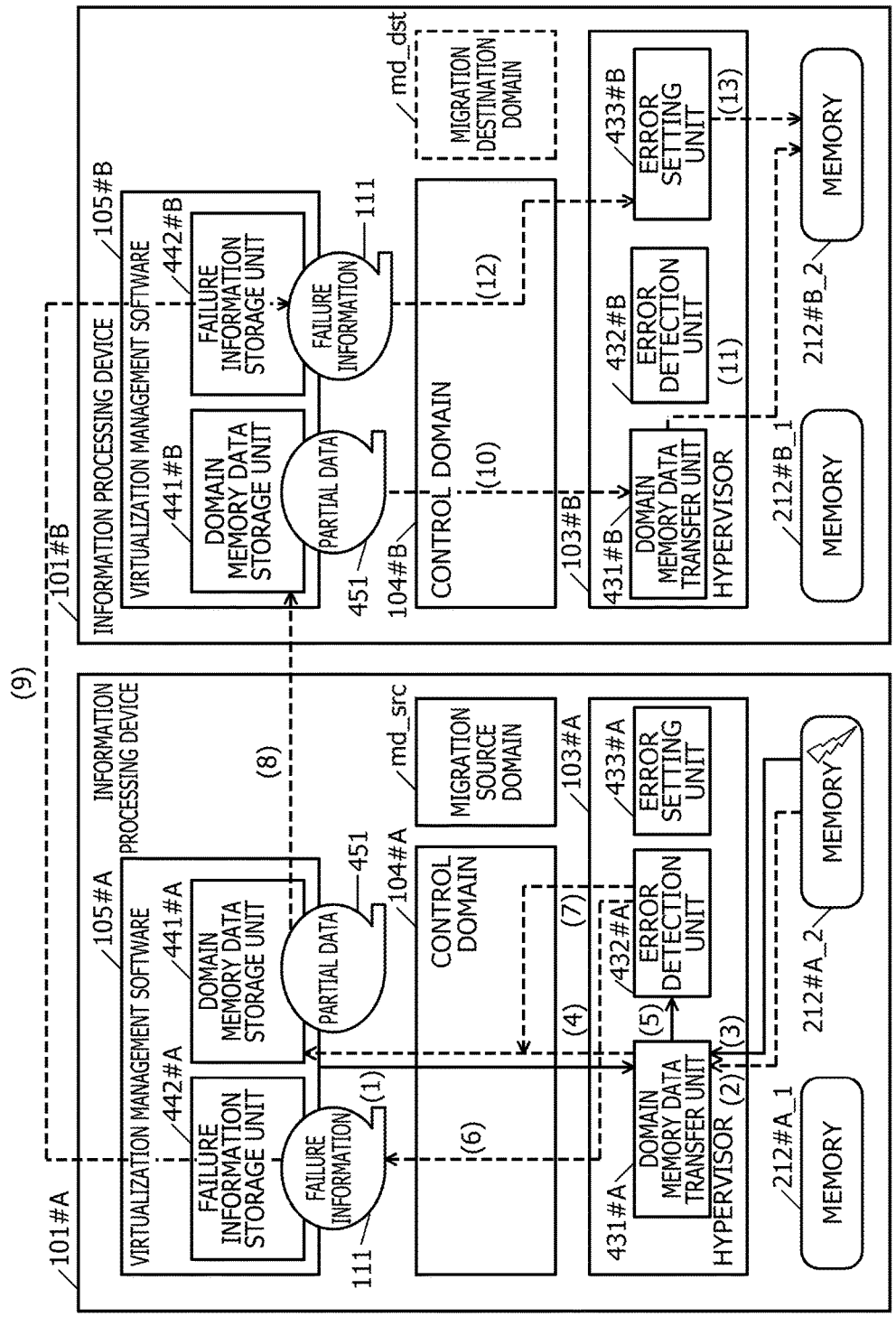
FIG. 4 is an explanatory diagram illustrating examples of a control flow and a data flow at the time of migration.

FIG. 4 is an explanatory diagram illustrating examples of a control flow and a data flow at the time of migration. The hypervisors 103 each include a domain memory data transfer unit 431, an error detection unit 432, and an error setting unit 433. Operations of the respective units will be described below. In addition, the pieces of virtualization management software 105 each include a domain memory data storage unit 441 and a failure information storage unit 442.

In FIG. 4, the migration source domain md_src uses a memory 212#A_2, and a memory 212#B_2 is secured in the migration destination domain md_dst. A state illustrated in FIG. 4 indicates a stare before migration, and the migration destination domain md_dst does not operate yet. In FIG. 4, the domain that does not operate yet is indicated by a dotted line.

By using FIG. 4, the control flow and the data flow of migration will be described. Here, in FIG. 4, the control flow is indicated by solid arrows, and the data flow is indicated by dashed arrows. As a processing operation indicated in (1) in FIG. 4, the virtualization management software 105#A requests the hypervisor 103#A to read the information of the migration source domain md_src into the domain memory data transfer unit 431#A of the migration source domain md_src.

Upon starting migration, the virtualization management software 105#A transfers an entire memory 212#A_2 in units of blocks. In addition, the virtualization management software 105#A repeats processing for transferring points within the memory 212#A_2, updated by the domain of the migration source domain md_src during transfer, and reduces a difference between the memory 212#A_2 and a memory 212#B_2. In addition, the virtualization management software 105#A stops the migration source domain md_src for a moment and transfers the reduced difference. After the reduced difference is transferred, the virtualization management software 105#B initiates an operation of the migration destination domain md_dst. Hereinafter, data transferred once is called "partial data".

As a processing operation illustrated in (2) in FIG. 4, the domain memory data transfer unit 431#A that receives the request reads, from the memory 212#A_2, partial data of the migration source domain md_src. In addition, in a case where an error occurs at the time of reading, as a processing operation illustrated in (3) in FIG. 4, the domain memory data transfer unit 431#A receives Trap, thereby detecting a failure.

In a case of not detecting a failure, as a processing operation illustrated in (4) in FIG. 4, the domain memory data transfer unit 431#A stores read partial data 451 in the domain memory data storage unit 441#A in the virtualization management software 105#A.

Figure 6:
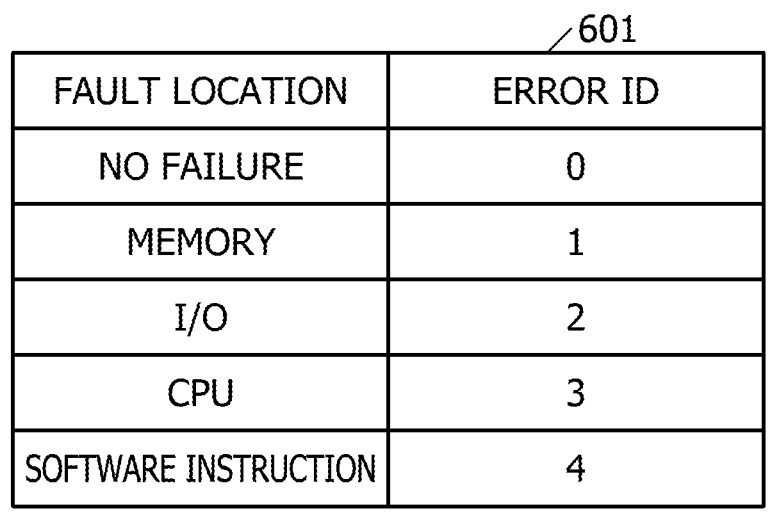
FIG. 6 is an explanatory diagram illustrating examples of the type of error ID.

In a case of detecting a failure, as a processing operation illustrated in (5) in FIG. 4, the domain memory data transfer unit 431#A references the corresponding error status register, acquires the types of address, data size, and failure of a damaged memory, and notifies the error detection unit 432#A in the hypervisor 103#A thereof. As a processing operation illustrated in (6) in FIG. 4, the error detection unit 432#A that receives the notice of the types of address, data size, and failure of the damaged memory stores the corresponding failure information 111 in the failure information storage unit 442#A in the virtualization management software 105#A. FIG. 5 illustrates an example of the failure information 111. In addition, FIG. 6 illustrates examples of the type of failure.

In addition, as a processing operation illustrated in (7) in FIG. 4, the error detection unit 432#A stores the temporary information in the domain memory data storage unit 441#A in the virtualization management software 105#A. Hereinafter, it is assumed that the temporary information is included in the partial data 451.

Here, information of a domain is managed on the memories 212 by using a physical address. On the other hand, the pieces of virtualization management software 105 each manage information by using real addresses independent in respective domains. In addition, a real address of a piece of partial data becomes equal in the migration source domain md_src and the migration destination domain md_dst. On the other hand, a physical address of a piece of partial data is likely to have different values in the memory 212#A_2 and the memory 212#B_2.

Processing for conversion from a physical address to a real address and processing for conversion from a real address to a physical address may be performed by the corresponding hypervisor 103 or may be performed by the corresponding virtualization management software 105. In addition, the information processing device 101#A may perform the processing for conversion from a physical address to a real address by using the hypervisor 103#A, and the information processing device 101#B may perform the processing for conversion from a real address to a physical address by using the virtualization management software 105#B. Alternatively, the information processing device 101#A may perform the processing for conversion from a physical address to a real address by using the virtualization management software 105#A, and the information processing device 101#B may perform the processing for conversion from a real address to a physical address by using the hypervisor 103#B. In the present embodiment, it is assumed that each of the conversion processing operations is performed by the corresponding hypervisor 103.

As a processing operation illustrated in (8) in FIG. 4, the virtualization management software 105#A transmits, to the information processing device 101#B, the partial data 451 stored in the domain memory data storage unit 441#A. The information processing device 101#B stores the received partial data 451 in the domain memory data storage unit 441#B in the virtualization management software 105#B. In addition, as a processing operation illustrated in (9) in FIG. 4, the virtualization management software 105#A transmits, to the information processing device 101#B, the failure information 111 stored in the failure information storage unit 442#A. The information processing device 101#B stores the received failure information 111 in the failure information storage unit 442#B in the virtualization management software 105#B.

As a processing operation illustrated in (10) in FIG. 4, the virtualization management software 105#B transmits, to the hypervisor 103#B, the partial data 451 stored in the domain memory data storage unit 441#B. As a processing operation illustrated in (11) in FIG. 4, the hypervisor 103#B that receives the partial data 451 writes the partial data 451 into the memory 212#B_2. In addition, as a processing operation illustrated in (12) in FIG. 4, the virtualization management software 105#B transmits, to the hypervisor 103#B, the failure information 111 stored in the failure information storage unit 442#B.

As a processing operation illustrated in (13) in FIG. 4, the error setting unit 433#B in the hypervisor 103#B that receives the failure information 111 converts, to a physical address, a real address corresponding to the received failure information 111 and writes the converted physical address into a register into which a UE is inserted. The CPU 211#B writes the converted physical address from the register into the memory 212#B. Specifically, the CPU 211#B makes a mark so as to indicate that a point at the physical address written into the register is damaged, and the CPU 211#B inputs, to the memory 212#B, an error ID=4 illustrated in FIG. 6. At the time of the occurrence of an access, the CPU 211#B is able to recognize "being damaged", and the error ID exists in the memory 212#B. Therefore, the CPU 211#B stores it in the error status register. Note that the CPU 211#B may write a converted physical address into a memory controller that controls the memory 212#B.

FIG. 5 is an explanatory diagram illustrating an example of the failure information 111. Each of records in a table 501 illustrated in FIG. 5 corresponds to the failure information 111. The failure information 111 includes items of an address, a data size, and a type. In the address item, an address of a memory, at which a failure occurs, is stored. Here, a physical address of a memory, at which a failure occurs, is stored in the address item in some case, and a real address of a memory, at which a failure occurs, is stored therein in some case. An address of the failure information 111 transmitted and received in, for example, the processing operation illustrated in (9) in FIG. 4 corresponds to a real address. In addition, in the present embodiment, it is assumed that the processing for conversion between a real address and a physical address is performed by the corresponding hypervisor 103. Accordingly, in a case of performing failure detection at the time of, for example, reading, the hypervisor 103#A converts from the physical address of the memory 212#A_2, at which a failure occurs and which serves as a read source, to a real address.

The data sizes of respective memories are stored in the data size item. As illustrated in the table 501, the data sizes are likely to be different from one another. A type indicating whether or not an error is correctable is stored in the type item. "UE" illustrated in the table 501 indicates that a failure corresponding to an error difficult to error-correct occurs.

FIG. 6 is an explanatory diagram illustrating examples of the type of error ID. A table 601 illustrate din FIG. 6 illustrates a list of error IDs serving as the types of failure. An error ID=0 is an ID indicating that no failure occurs. An error ID=1 is an ID indicating that a failure occurs within a memory. An error ID=2 is an ID indicating that a failure occurs in an I/O. An error ID=3 is an ID indicating that a failure occurs within the corresponding CPU 211. An error ID=4 is an ID indicating being an instruction based on software. UEs of the errors ID=1 to 3 each correspond to the first identifier explained in FIG. 1. In addition, a UE of the error ID=4 corresponds to the second identifier explained in FIG. 1.

Here, in a case where, after completion of migration, a physical address in which the error ID=4 is set is accessed in the migration destination domain md_dst, the memory 212#B_2 normally functions. Therefore, the memory 212#B_2 does not have to be maintained. Next, as a specific example of an access, an example of an operation at the time of executing reading in the migration destination domain md_dst after completion of migration will be described by using FIG. 7. In addition, an example of an operation at the time of executing writing in the migration destination domain md_dst after completion of migration will be described by using FIG. 8.

Figure 7:
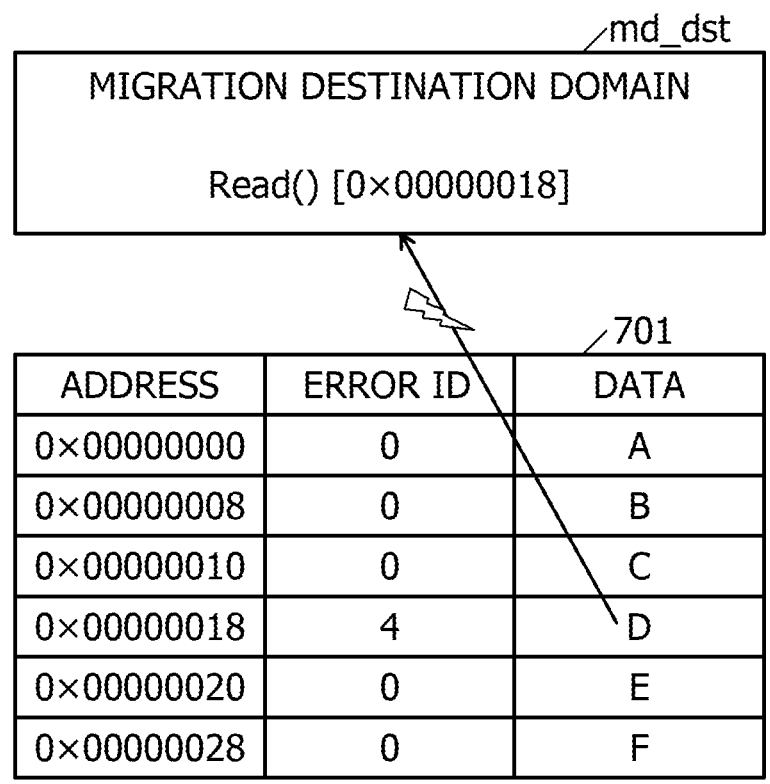
FIG. 7 is an explanatory diagram illustrating an example of an operation at the time of executing a read access in a migration destination domain.

FIG. 7 is an explanatory diagram illustrating an example of an operation at the time of executing a read access in the migration destination domain md_dst. A table 701 illustrated in FIG. 7 is a table in which the physical address of the memory 212#B_2, the value of the error ID corresponding to the physical address, and data stored in a storage area corresponding to the physical address are put together. No failure occurs at, for example, a physical address of "0x00000000", and data of "A" is stored thereat. In addition, as illustrated in the table 701, the error ID=4 is set for a physical address of "0x00000018".

As illustrated in FIG. 7, it is assumed that Trap is detected during execution of a read access to the address of "0x00000018". At this time, the hypervisor 103#B interrupts currently performed processing. Here, UE detection identifies being based on a software instruction, and hardware does not give notice of a failure.

Figure 8:
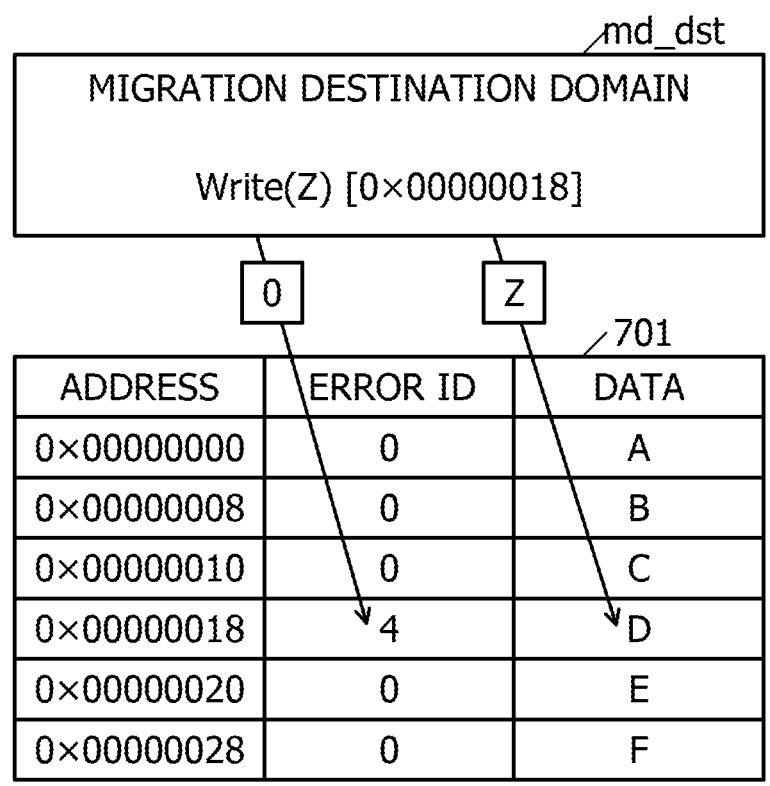
FIG. 8 is an explanatory diagram illustrating an example of an operation at the time of executing a write access in the migration destination domain.

FIG. 8 is an explanatory diagram illustrating an example of an operation at the time of executing a write access in the migration destination domain md_dst. As illustrated in FIG. 8, Trap is not raised to software at the time of executing the write access. The corresponding CPU 211 sets, to "0", an error ID for the physical address of "0x00000018" and deletes the corresponding UE.

Figure 9:
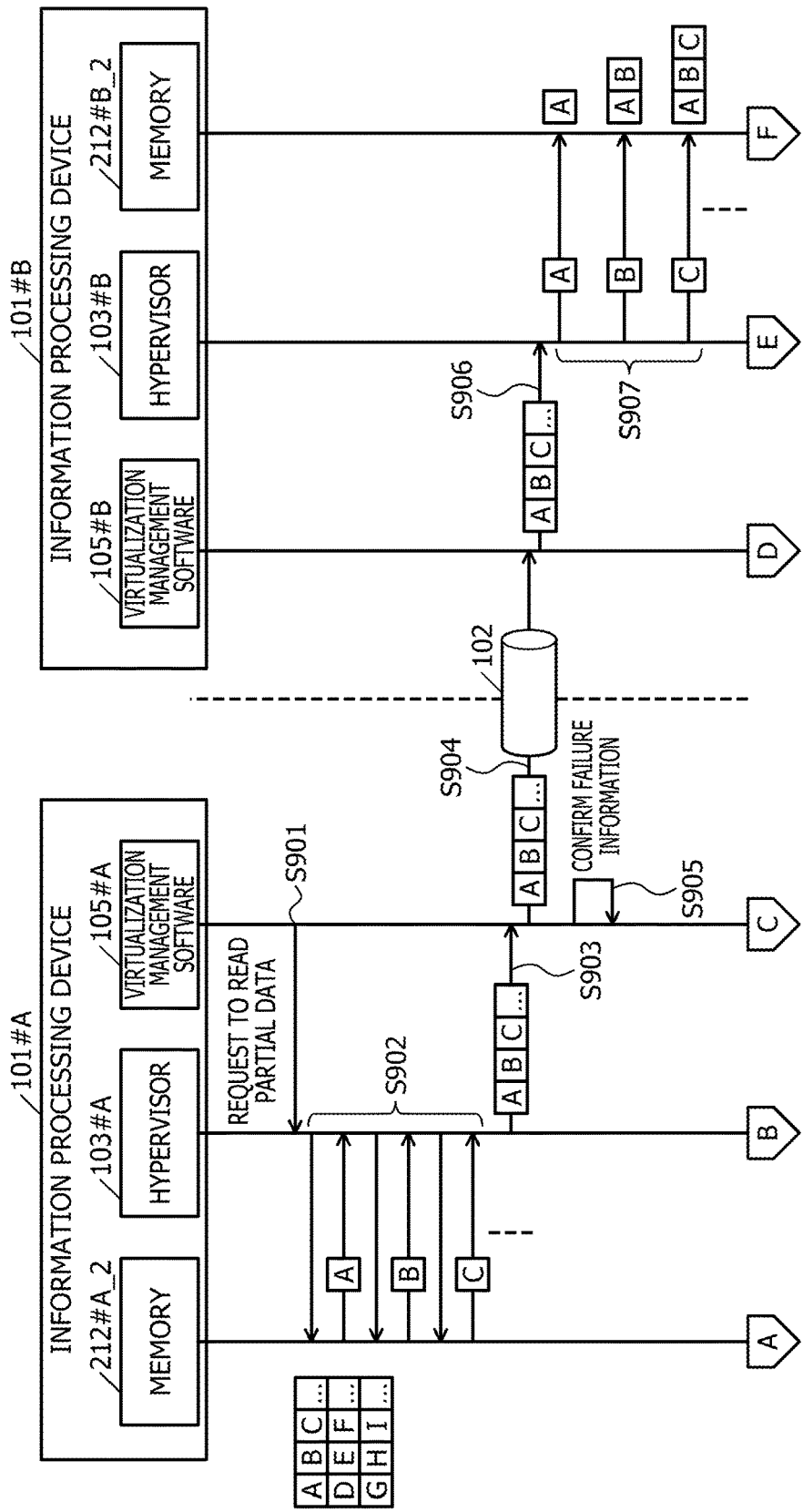
FIG. 9 is an explanatory diagram (part one) illustrating an example of a migration sequence in the system.
Figure 10:
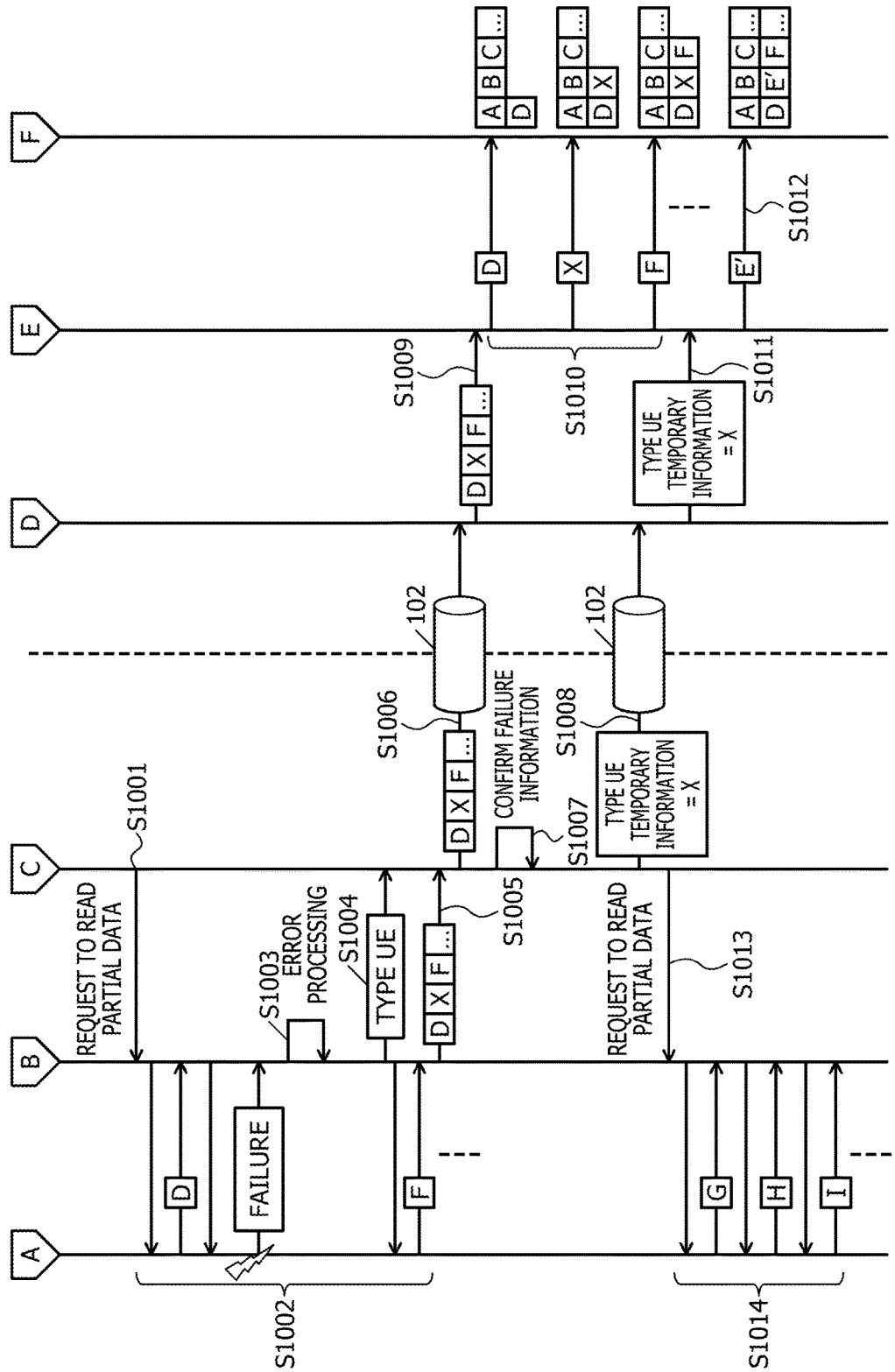
FIG. 10 is an explanatory diagram (part two) illustrating an example of the migration sequence in the system.

FIG. 9 is an explanatory diagram (part one) illustrating an example of a migration sequence in the system 100. In addition, FIG. 10 is an explanatory diagram (part two) illustrating an example of the migration sequence in the system 100. It is assumed that, in a state before performing migration, the memory 212#A_2 stores therein pieces of data of A, B, C, . . . , D, E, F, . . . , G, H, I, . . . to serve as the partial data 451. The virtualization management software 105#A transmits, to the hypervisor 103#A, a request to read the partial data 451 (S901).

The hypervisor 103#A that receives the request to read the partial data 451 reads, from the memory 212#A_2, the pieces of data of A, B, C, . . . to serve as the partial data 451 (S902). In addition, the hypervisor 103#A transmits, to the virtualization management software 105#A, the pieces of data of A, B, C, . . . to serve as the partial information 451 (S903). In addition, the virtualization management software 105#A transmits, to the information processing device 101#B via the network 102, the pieces of data of A, B, C, . . . to serve as the partial data 451 (S904). In addition, the virtualization management software 105#A confirms the presence or absence of a notice of the failure information 111 (S905). In the example of S905, the virtualization management software 105#A determines the absence of a notice of the failure information 111 and does not perform processing for the failure information 111.

The virtualization management software 105#B that receives the pieces of data of A, B, C, . . . to serve as the partial data 451 transmits, to the hypervisor 103#B, the pieces of data of A, B, C, . . . to serve as the partial data 451 (S906). The hypervisor 103#B that receives the pieces of data of A, B, C, . . . to serve as the partial data 451 writes, into the memory 212#B_2, the pieces of data of A, B, C, . . . to serve as the partial data 451 (S907).

After S905, the virtualization management software 105#A determines that there is information, which is not transmitted to the information processing device 101#B yet and which is included in the information of the migration source domain md_src, and transmits, to the hypervisor 103#A, a request to read the partial data 451 (S1001). The hypervisor 103#A that receives the request to read the partial data 451 reads, from the memory 212#A_2, the pieces of data of D, F, . . . to serve as the partial data 451 (S1002). In a case of detecting Trap due to a failure in the middle of S1002, as error processing, the hypervisor 103#A references the error status register and acquires the types of address, data size, and failure of a damaged memory (S1003).

In addition, the hypervisor 103#A transmits, to the virtualization management software 105#A, the failure information 111 serving as a type UE (S1004). In addition, the hypervisor 103#A transmits, to the virtualization management software 105#A, pieces of data of D, X, F, . . . to serve as the partial data 451 (S1005). Here, the data of X is temporary information corresponding to the data of E difficult to read.

The virtualization management software 105#A that receives the pieces of data of D, X, F, . . . to serve as the partial data 451 transmits, to the information processing device 101#B via the network 102, the pieces of data of D, X, F, . . . to serve as the partial data 451 (S1006). In addition, the virtualization management software 105#A confirms the presence or absence of a notice of the failure information 111 (S1007). In the example of S1007, the virtualization management software 105#A determines that the notice of the failure information 111 is received, and the virtualization management software 105#A transmits, to the information processing device 101#B via the network 102, the failure information 111 that serves as the type UE and in which the temporary information is the data of X (S1008).

The virtualization management software 105#B that receives the pieces of data of D, X, F, . . . to serve as the partial data 451 transmits, to the hypervisor 103#B, the pieces of data of D, X, F, . . . to serve as the partial data 451 (S1009). The hypervisor 103#B that receives the pieces of data of D, X, F, . . . to serve as the partial data 451 writes, into the memory 212#B_2, the pieces of data of D, X, F, . . . to serve as the partial data 451 (S1010).

In addition, the virtualization management software 105#B that receives the failure information 111, which serves as the type UE and in which the temporary information is the data of X, transmits the failure information 111 to the hypervisor 103#B (S1011). The hypervisor 103#B that receives the failure information 111 writes the address of the data of X, identified by the failure information 111, into a register in which the UE of the CPU 211#B is set. In addition, the CPU 211#B performs a setting of hardware so that Trap is raised in a case where the address of the data of X is accessed (S1012).

After S1008, the virtualization management software 105#A determines that there is information, which is not transmitted to the information processing device 101#B yet and which is included in the information of the migration source domain md_src, and transmits, to the hypervisor 103#A, a request to read the partial data 451 (S1013). The hypervisor 103#A that receives the request to read the partial data 451 reads, from the memory 212#A_2, the pieces of data of G, H, I, . . . to serve as the partial data 451 (S1014).

After that, the virtualization management software 105#A transmits, to the hypervisor 103#A, requests to read the partial data 451 until the entire data of the migration source domain md_src is transmitted to the information processing device 101#B. Next, migration processing performed by the system 100 will be described by using FIG. 11 to FIG. 16.

Figure 11:
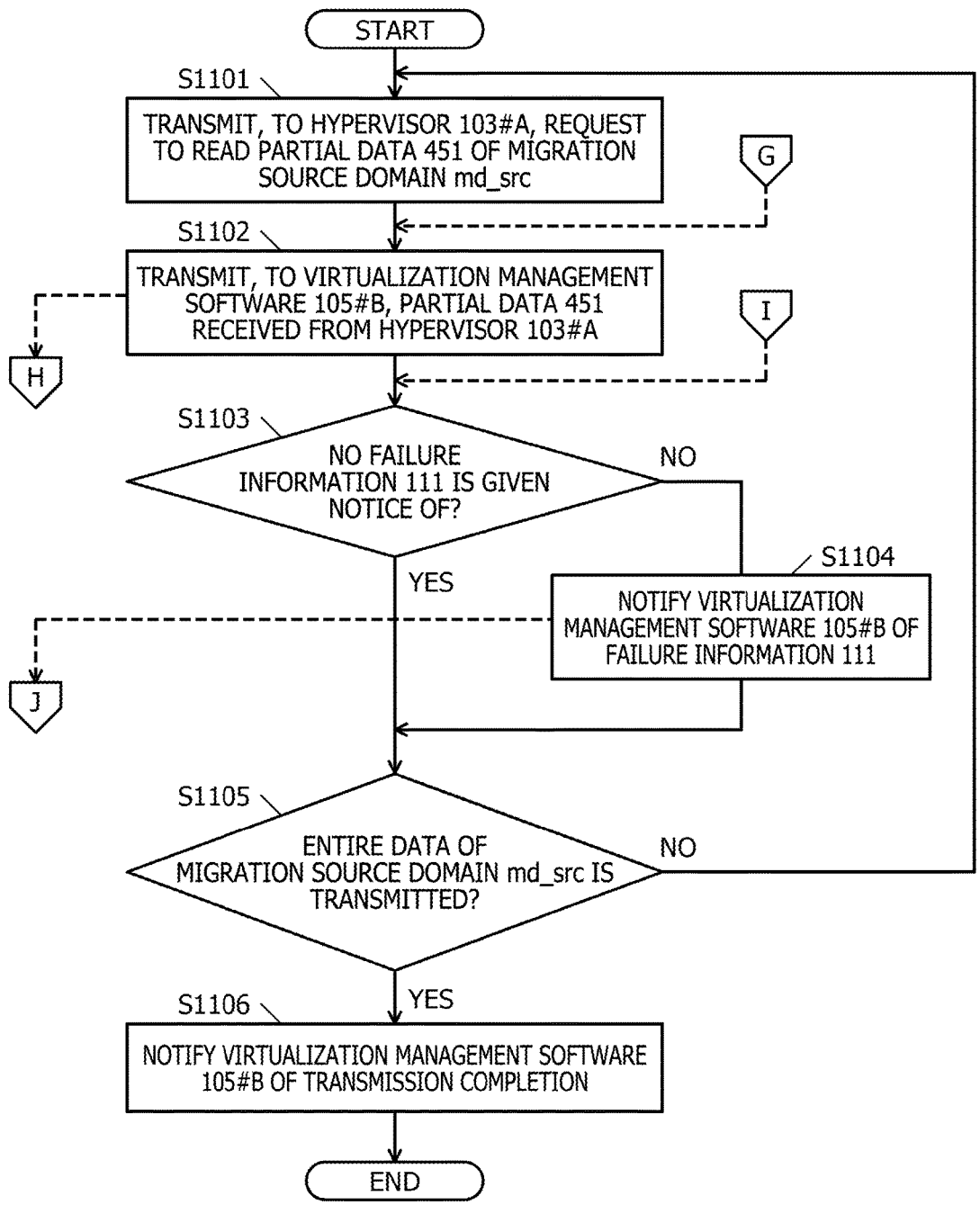
FIG. 11 is a flowchart illustrating an example of a migration processing procedure in virtualization management software in a migration source.

FIG. 11 is a flowchart illustrating an example of a migration processing procedure in virtualization management software in a migration source. Migration processing in the virtualization management software in a migration source is processing performed by the virtualization management software 105#A at the time of migration.

The virtualization management software 105#A transmits, to the hypervisor 103#A, a request to read the partial data 451 of the migration source domain md_src (S1101). The hypervisor 103#A performs domain memory data read processing illustrated in FIG. 12. The virtualization management software 105#A waits for a response from the hypervisor 103#A.

Figure 12:
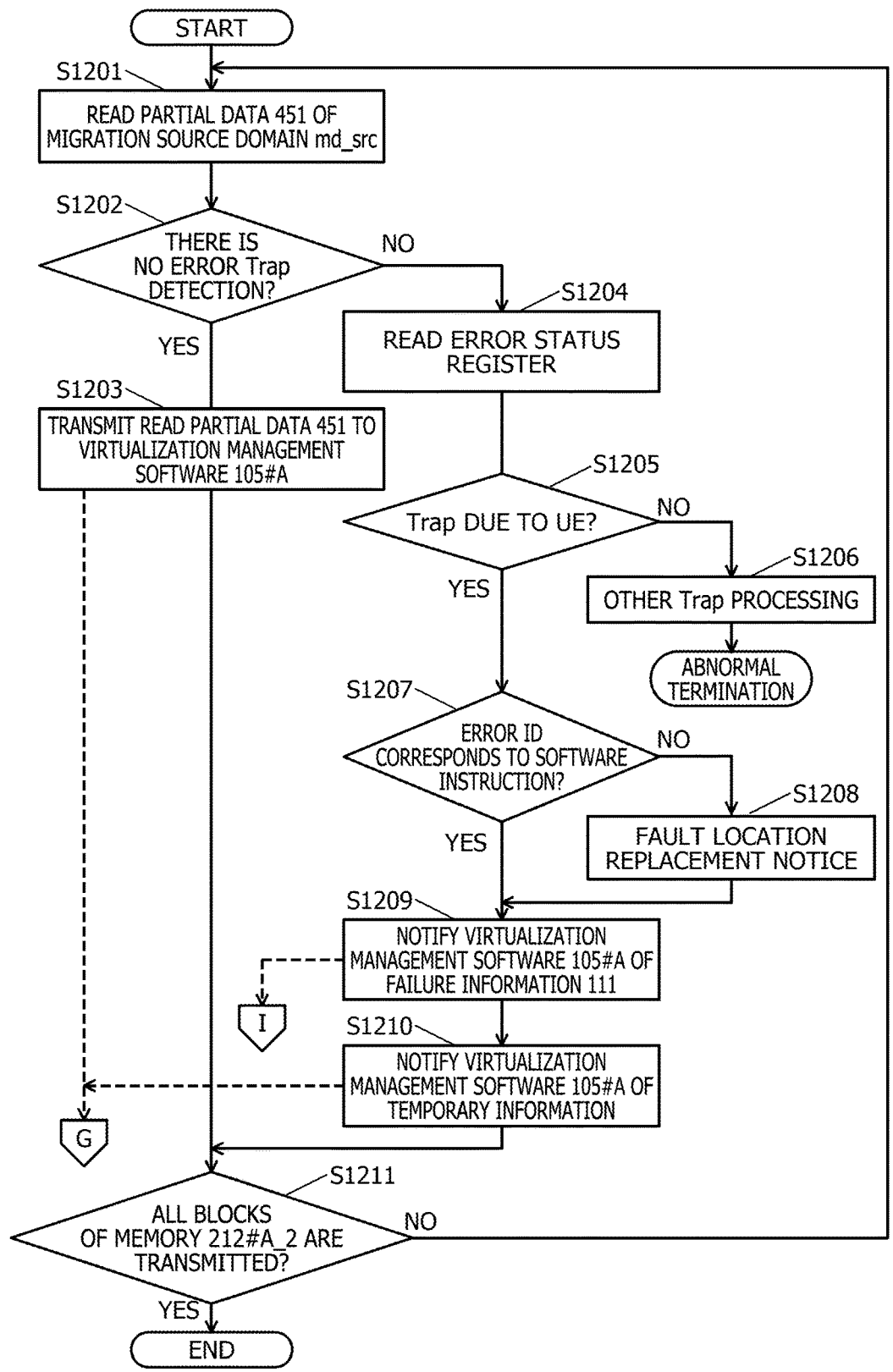
FIG. 12 is a flowchart illustrating an example of a domain memory data read processing procedure.

The virtualization management software 105#A, which receives, based on a processing operation in S1203 or S1210 illustrated in FIG. 12, the partial data 451 from the hypervisor 103#A, transmits, to the virtualization management software 105#B, the partial data 451 received from the hypervisor 103#A (S1102). Next, based on a processing operation in S1209 illustrated in FIG. 12, the virtualization management software 105#A determines whether or not no failure information 111 is given notice of (S1103). In a case where the failure information 111 is given notice of (S1103: No), the virtualization management software 105#A notifies the virtualization management software 105#B of the failure information 111 (S1104).

After the processing operation in S1104 finishes or in a case where no failure information 111 is given notice of (S1103: Yes), the virtualization management software 105#A determines whether or not the entire data of the migration source domain md_src is transmitted (S1105). In a case where there is information that is not transmitted yet and that is included in the information of the migration source domain md_src (S1105: No), the virtualization management software 105#A makes a transition to the processing operation in S1101.

On the other hand, in a case where the entire data of the migration source domain md_src is transmitted (S1105: Yes), the virtualization management software 105#A notifies the virtualization management software 105#B of transmission completion (S1106). After the processing operation in S1106 finishes, the virtualization management software 105#A terminates the migration processing in the virtualization management software in a migration source. By performing the migration processing in the virtualization management software in a migration source, the virtualization management software 105#A transmits the information of the migration source domain md_src to the virtualization management software 105#B.

FIG. 12 is a flowchart illustrating an example of a domain memory data read processing procedure. Domain memory data read processing is processing for reading the information of the migration source domain md_src.

The hypervisor 103#A reads the partial data 451 of the migration source domain md_src (S1201). In addition, the hypervisor 103#A determines whether or not there is no error trap detection (S1202). In a case where there is no error trap detection (S1202: Yes), the hypervisor 103#A transmits the read partial data 451 to the virtualization management software 105#A (S1203).

On the other hand, in a case where there is error trap detection (S1202: No), the hypervisor 103#A reads the error status register (S1204). In addition, the hypervisor 103#A determines whether or not being Trap due to a UE (S1205). In a case of not being Trap due to a UE (S1205: No), the hypervisor 103#A performs other Trap processing (S1206). In addition, the hypervisor 103#A abnormally terminates the domain memory data read processing.

In a case of being Trap due to a UE (S1205: Yes), the hypervisor 103#A determines whether or not the error ID corresponds to a software instruction (S1207). In a case where the error ID does not correspond to a software instruction (S1207: No), the hypervisor 103#A issues a fault location replacement notice (S1208).

Regarding the processing operation in S1208, the hypervisor 103#A issues an replacement notice of, for example, a DIMM corresponding to a physical address stored in the error status register. In a case where a factor at the time of the occurrence of Trap is based on a software instruction, the corresponding memory 212 itself is not out of order while the information of the corresponding memory 212 is likely to cause a trouble. In this way, based on the processing operation in S1207 or S1208, the hypervisor 103#A is able to keep from issuing a notice not based on the fact, such as issuing an replacement notice for the corresponding memory 212 not out of order.

After the processing operation in S1208 finishes or in a case where the error ID corresponds to a software instruction (S1207: Yes), the hypervisor 103#A notifies the virtualization management software 105#A of the failure information 111 (S1209). In addition, the hypervisor 103#A notifies the virtualization management software 105#A of the temporary information (S1210).

After the processing operation in S1203 or S1210 finishes, the hypervisor 103#A determines whether or not all blocks of the memory 212#A_2 are transmitted (S1211). In a case where all the blocks of the memory 212#A_2 are not transmitted yet (S1211: No), the hypervisor 103#A makes a transition to the processing operation in S1201. On the other hand, in a case where all the blocks of the memory 212#A_2 are transmitted (S1211: Yes), the hypervisor 103#A terminates the domain memory data read processing. By performing the domain memory data read processing, the hypervisor 103#A transmits the information of the migration source domain md_src to the virtualization management software 105#A.

Figure 13:
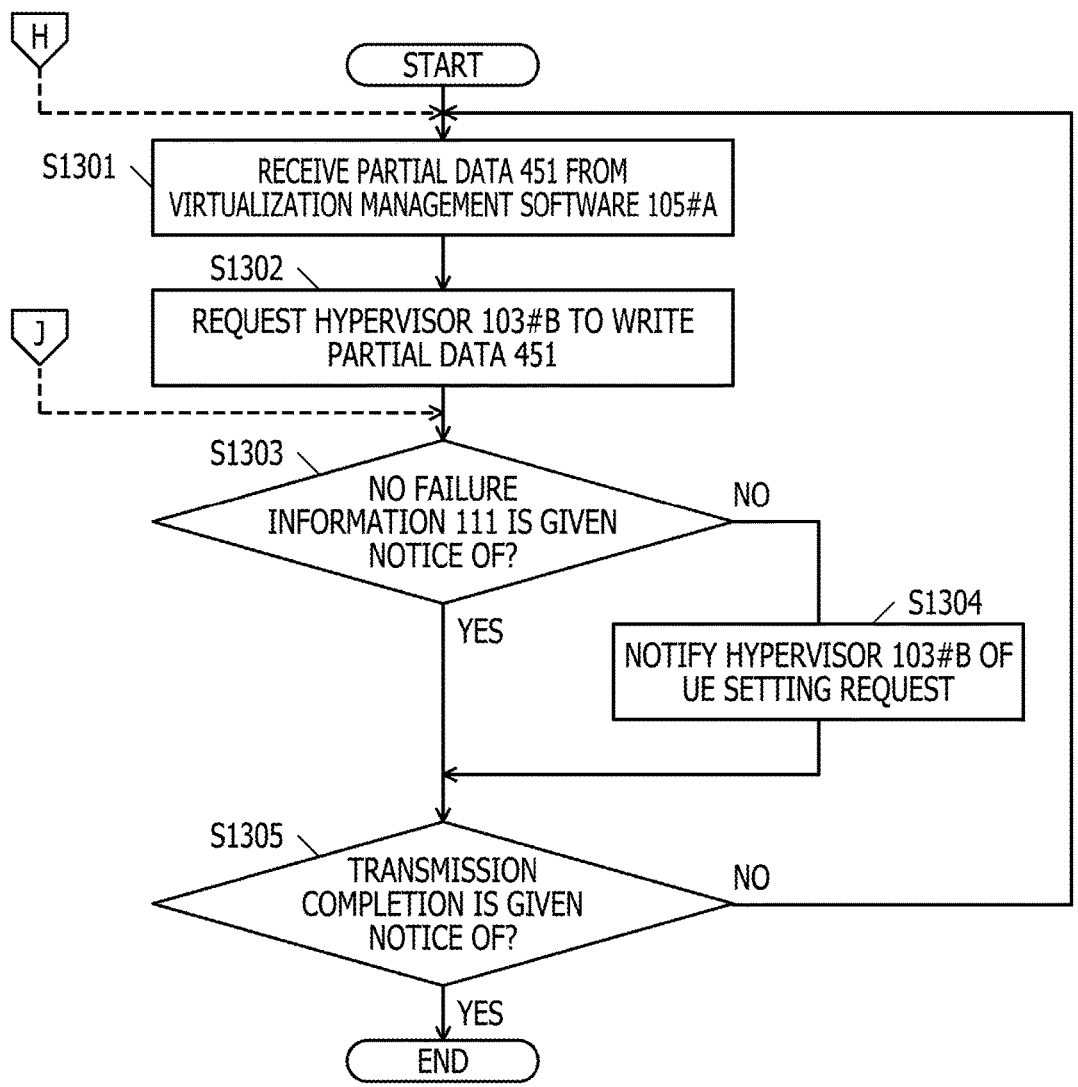
FIG. 13 is a flowchart illustrating an example of a migration processing procedure in virtualization management software in a migration destination.

FIG. 13 is a flowchart illustrating an example of a migration processing procedure in virtualization management software in a migration destination. Migration processing in the virtualization management software in a migration destination is processing performed by the virtualization management software 105#B at the time of migration.

Based on the processing operation in S1102 illustrated in FIG. 11, the virtualization management software 105#B receives the partial data 451 from the virtualization management software 105#A (S1301). In addition, the virtualization management software 105#B requests the hypervisor 103#B to write the partial data 451 (S1302).

Next, the virtualization management software 105#B determines whether or not, based on the processing operation in S1104 illustrated in FIG. 11, the virtualization management software 105#B is notified of no failure information 111 (S1303). In a case of being notified of the failure information 111 (S1303: No), the virtualization management software 105#B notifies the hypervisor 103#B of a UE setting request (S1304). Upon receiving the UE setting request, the hypervisor 103#B performs UE setting processing illustrated in FIG. 15. In addition, the UE setting request includes the failure information 111.

After the processing operation in S1304 finishes or in a case of being notified of no failure information 111 (S1303: Yes), the virtualization management software 105#B determines whether or not being notified of transmission completion (S1305). In a case of not being notified of the transmission completion (S1305: No), the virtualization management software 105#B makes a transition to the processing operation in S1301. On the other hand, in a case of being notified of the transmission completion (S1305: Yes), the virtualization management software 105#B completes transferring of the information of the migration source domain md_src in the virtualization management software in a migration destination.

Figure 14:
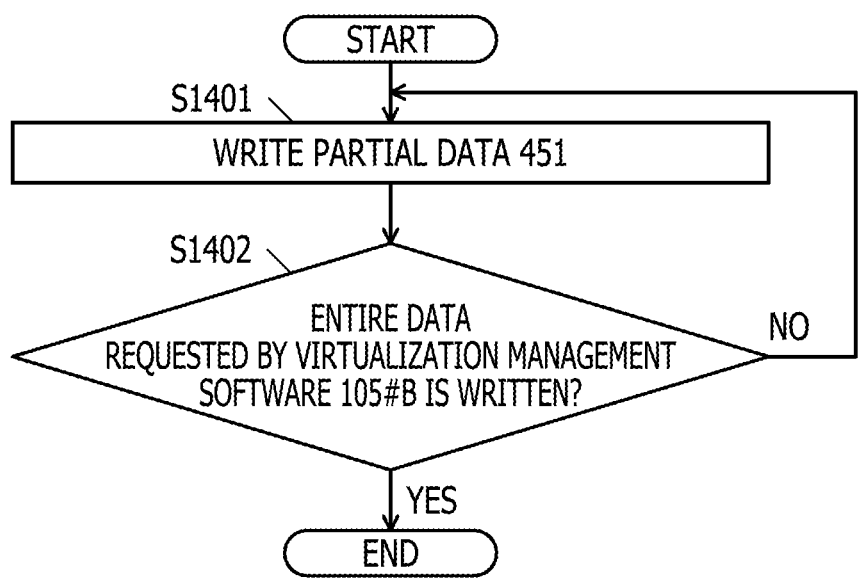
FIG. 14 is a flowchart illustrating an example of a domain memory data write processing procedure.

FIG. 14 is a flowchart illustrating an example of a domain memory data write processing procedure. Domain memory data write processing is processing for writing the information of the migration source domain md_src. Here, the domain memory data write processing is requested by the domain memory data transfer unit 431#B illustrated in FIG. 4. In the following description, the domain memory data write processing will be described while it is assumed that the domain memory data write processing is performed by the hypervisor 103#B.

The hypervisor 103#B writes the partial data 451 into the memory 212#B_2 (S1401). In addition, the hypervisor 103#B determines whether or not entire data requested by the virtualization management software 105#B is written (S1402). In a case where there is information not written yet (S1402: No), the hypervisor 103#B makes a transition to the processing operation in S1401. On the other hand, in a case where the entire data requested by the virtualization management software 105#B is written (S1402: Yes), the hypervisor 103#B terminates the domain memory data write processing.

Figure 15:
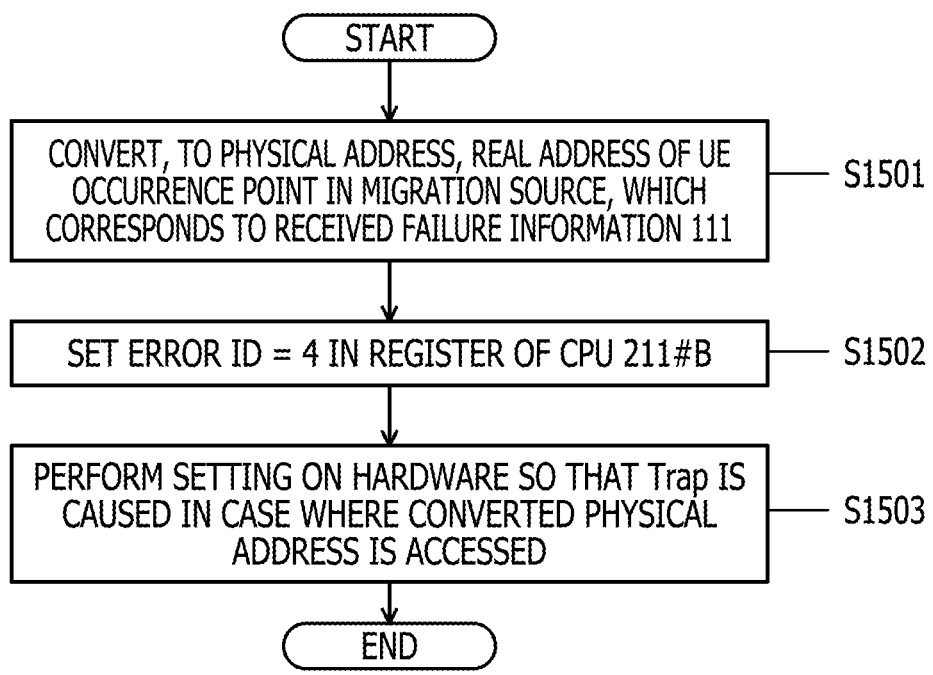
FIG. 15 is a flowchart illustrating an example of a UE setting processing procedure.

FIG. 15 is a flowchart illustrating an example of a UE setting processing procedure. UE setting processing is processing for setting a UE for a UE occurrence point in a migration source. Here, the UE setting processing is performed by the error setting unit 433#B illustrated in FIG. 4. In the following description, the UE setting processing will be described while it is assumed that the UE setting processing is performed by the hypervisor 103#B.

The hypervisor 103#B converts, to a physical address, the real address of a UE occurrence point in a migration source, which corresponds to the received failure information 111 (S1501). Next, the hypervisor 103#B sets the error ID=4 in a register of the CPU 211#B (S1502). After that, the CPU 211#B sets the error ID=4 at the relevant point. An area subjected to the setting is located within the corresponding memory 212 in some cases, and the area subjected to the setting is located within a memory controller that controls the corresponding memory 212, in some cases.

In addition, the hypervisor 103#B performs a setting on hardware of the information processing device 101#B so that Trap is caused in a case where the converted physical address is accessed (S1503). Specifically, if the physical address is set in a register of the CPU 211#B, the CPU 211#B combines the error ID=4 therewith and performs a setting. From this, Trap is caused in a case where the converted physical address is read-accessed, and the error ID=4 is stored in the error status register.

After the processing operation in S1503 finishes, the hypervisor 103#B terminates the UE setting processing. In addition, in a case where, in a write access to the converted physical address, it is difficult to overwrite, the error ID=4 is stored in the error status register.

Figure 16:
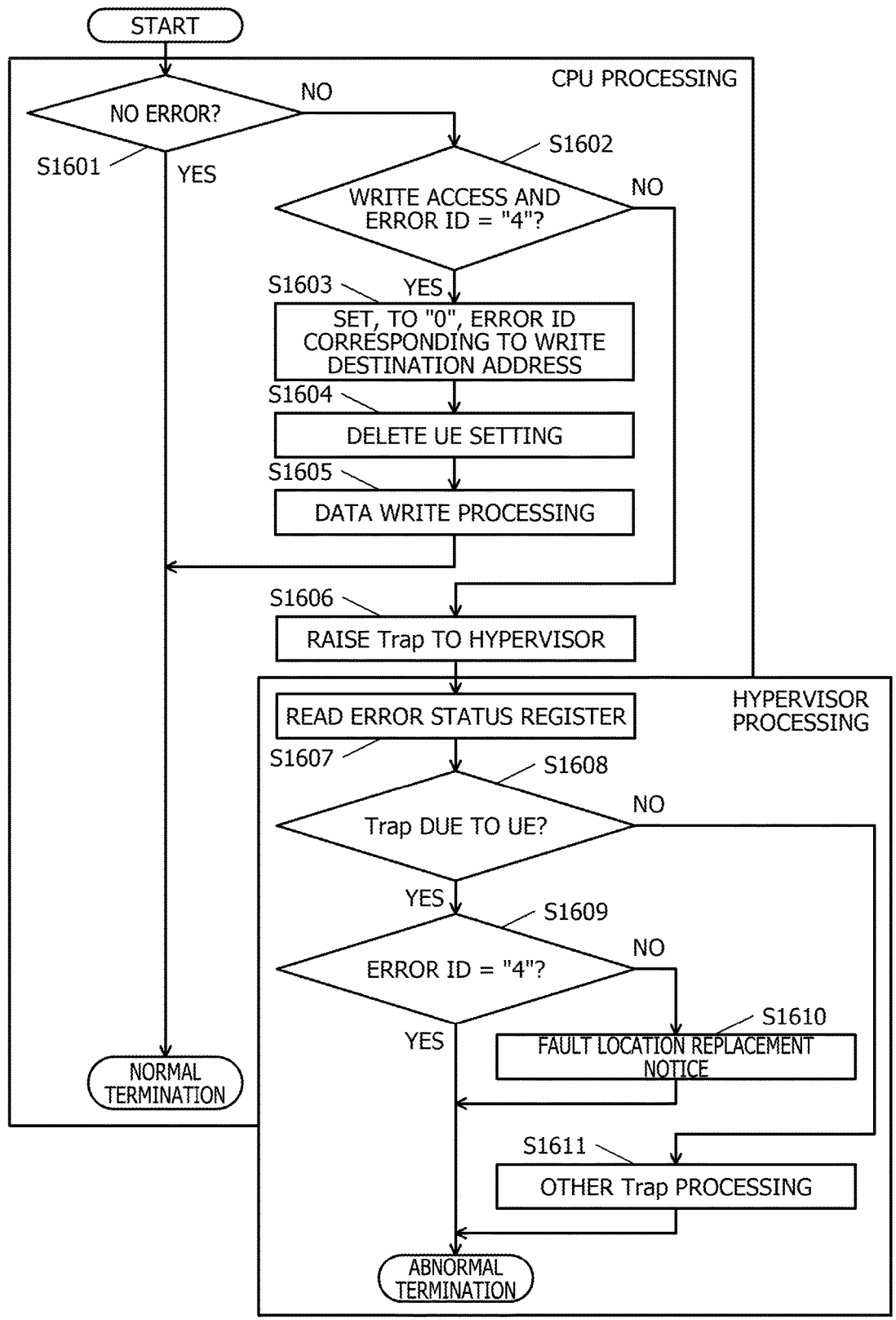
FIG. 16 is a flowchart illustrating an example of an access processing procedure after migration.

FIG. 16 is a flowchart illustrating an example of an access processing procedure after migration. It is processing in a case where a memory access after migration is generated. As illustrated in FIG. 16, processing operations in S1601 to S1606 are processing operations performed by the CPU 211#B, and processing operations in S1607 to S1611 are processing operations performed by the hypervisor 103#B. After migration, application software operates as usual, and if Trap occurs, the hypervisor 103#B detects Trap. In a usual memory access during the operation of the application software, the hypervisor 103#B does nothing.

The CPU 211#B determines whether or not there is no error (S1601). In a case where there is no error (S1601: Yes), the CPU 211#B shifts to a usual memory access and completes access processing after migration.

In a case where there is an error (S1601: No), the CPU 211#B determines whether or not a memory access is a write access and the error ID is "4" (S1602). Note that a case where, regarding "S1601: No", there is an error is a case where the CPU 211#B detects garbled data or a case where the CPU 211#B detects a point marked as being damaged.

In a case where the memory access is a write access and the error ID is "4" (S1602: Yes), the CPU 211#B sets, to "0", the error ID corresponding to a write destination address (S1603). Next, the CPU 211#B deletes a UE setting (S1604). In addition, the CPU 211#B performs data write processing (S1605). After the processing operation in S1605 finishes, the CPU 211#B completes the access processing after migration.

In a case where the memory access is a read access or the error ID is not "4" (S1602: No), the CPU 211#B raises Trap to the hypervisor 103#B (S1606). In a case where Trap is caused, the hypervisor 103#B reads the error status register (S1607). Next, the hypervisor 103#B determines whether or not the caused Trap is Trap due to an UE (S1608).

In a case where the caused Trap is Trap due to an UE (S1608: Yes), the hypervisor 103#B determines whether or not the error ID is "4" (S1609). In a case where the error ID is not "4" (S1609: No), the hypervisor 103#B issues a fault location replacement notice (S1610). In addition, in a case of Trap not due to a UE (S1608: No), the hypervisor 103#B performs other Trap processing (S1611).

In a case where the error ID is "4" (S1609: Yes) or after the processing operation in S1610 or S1611 finishes, the hypervisor 103#B abnormally terminates an access from application software or an OS. Note that, in a case where there is an error in the flowchart illustrated in FIG. 16, the CPU 211#B may raise Trap to the hypervisor 103#B, and the hypervisor 103#B may perform processing in a case of the write access and the error ID=4.

By performing the access processing after migration, even if the error ID=4 is satisfied and an error due to a UE occurs, the CPU 211#B is able to continue an operation in a case of a write access. In addition, if an access is a read access in a case where the error ID=4 is satisfied and an error due to a UE occurs, the hypervisor 103#B abnormally terminates a user program in a case of detecting the error during execution of the user program. In addition, if an access is a read access in a case where the error ID=4 is satisfied and an error due to a UE occurs, the hypervisor 103#B generates a kernel panic in a case of detecting during execution of a kernel.

As described above, in a case where the information processing device 101#A detects error information including a UE, the information processing device 101#B is notified of the failure information 111, and the information processing device 101#B writes a UE having the error ID=4 at an address corresponding to the failure information 111. From this, the information processing device 101#B is able to determine that the UE is an error caused by the information processing device 101#A and is not an error caused by the failure of hardware of the information processing device 101#B. In addition, since the UE is not an error caused by the failure of hardware of the information processing device 101#B, the information processing device 101#B is able to determine that it is possible to properly perform writing into a storage area having the information including the UE.

In addition, the information processing device 101#A may transmit, to a device serving as a migration destination, partly calculated information of software that operates on the migration source domain md_src and that is stored in a storage allocated to the migration source domain md_src. From this, after completion of migration, the information processing device 101#B is able to cause the software that operates on the migration source domain md_src to operate starting from a state of being partly calculated.

In addition, after completion of migration, in a case where there is an error due to a write access, if a UE whose error ID corresponds to a software instruction is stored in the error status register, the information processing device 101#B deletes the UE of the error ID corresponding to a software instruction and continues processing. From this, the information processing device 101#B is able to continue an operation of the migration destination domain md_dst. In addition, after completion of migration, in a case where Trap is caused by a read access, if a UE whose error ID corresponds to a software instruction is stored in the error status register, the information processing device 101#B interrupts software serving as a generation source of the read access. If the software serving as a generation source of the read access is, for example, a user program, the information processing device 101#B abnormally terminates the user program serving as a generation source of the read access. In this case, the information processing device 101#B is able to continue an operation of software other than the software serving as a generation source of the read access.

In addition, the information processing device 101#A may transmit, to the information processing device 101#B, temporary information corresponding to the information including the UE. From this, since the information processing device 101#A is able to combine data of a storage area and the temporary information with each other, the storage area being allocated to the migration source domain md_src and being included in memories in the device serving as a migration source, and to transmit the data of the storage area and the temporary information as information of a set of successive addresses, it is possible to efficiently perform transmission.

In addition, even if a UE is detected, the system 100 is able to make migration a success. In addition, in the migration destination domain md_dst, in a case of a write access to data including a UE due to a software instruction or in a case of not using data including a UE due to a software instruction, the system 100 is able to continue the operation of the migration destination domain md_dst.

In addition, by application to live migration, it is possible to migrate, to another normally functioning computer system, a domain utilizing a memory in which a failure of hardware occurs. Therefore, it becomes possible for the system 100 to replace a faulty component without stopping a business operation.

Description of Second Embodiment

Next, an example in which migration is applied to a technology called dynamic reconfiguration for deleting or adding some hardware resources while keeping continuing an operation of a domain at work will be described in a second embodiment. In the second embodiment, one board is regarded as one information processing device, and a domain is migrated between boards. Here, in the second embodiment, the same symbol is assigned to the same point as a point described in the first embodiment, and the illustration and the description thereof will be omitted.

Figure 17:
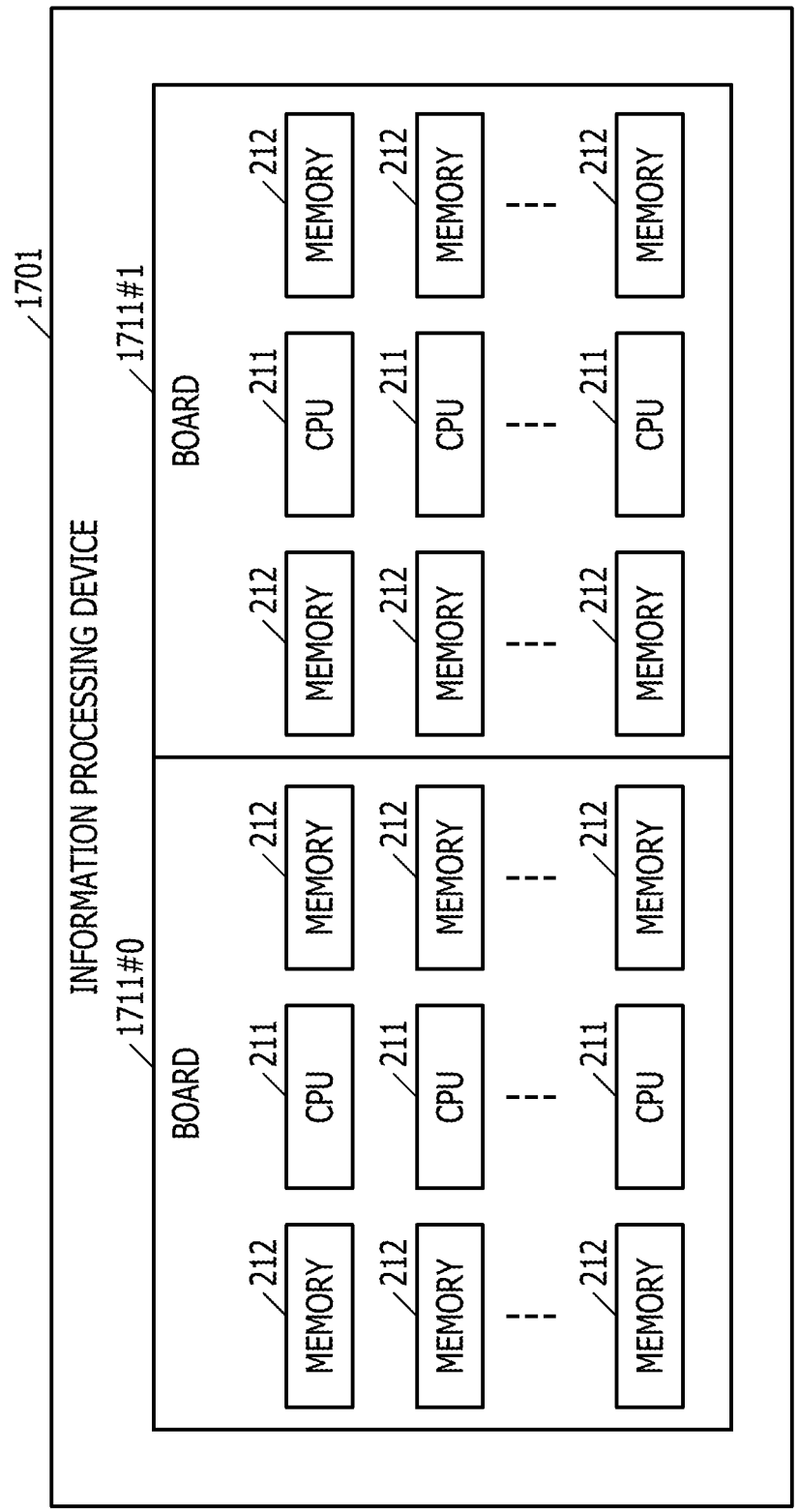
FIG. 17 is a block diagram illustrating an example of a configuration of an information processing device.

FIG. 17 is a block diagram illustrating an example of a configuration of an information processing device 1701. The information processing device 1701 includes two boards 1711#0 and 1711#1. As the dynamic reconfiguration, each of the boards 1711#0 and 1711#1 is able to be dynamically deleted even if the information processing device 1701 is in execution. In addition, the information processing device 1701 may include three or more boards 1711. Hereinafter, dynamically deleting a board is called "active board delete".

The boards 1711 each include one or more CPUs 211 and one or more memories 212. The boards 1711#0 and 1711#1 illustrated in FIG. 17 each include the CPUs 211 and the memories 212. The boards 1711#0 and 1711#1 are coupled to each other by an internal interface, and the CPUs 211 in one of the two boards 1711 are able to access the memories 212 in the other of the two boards 1711.

Figure 18:
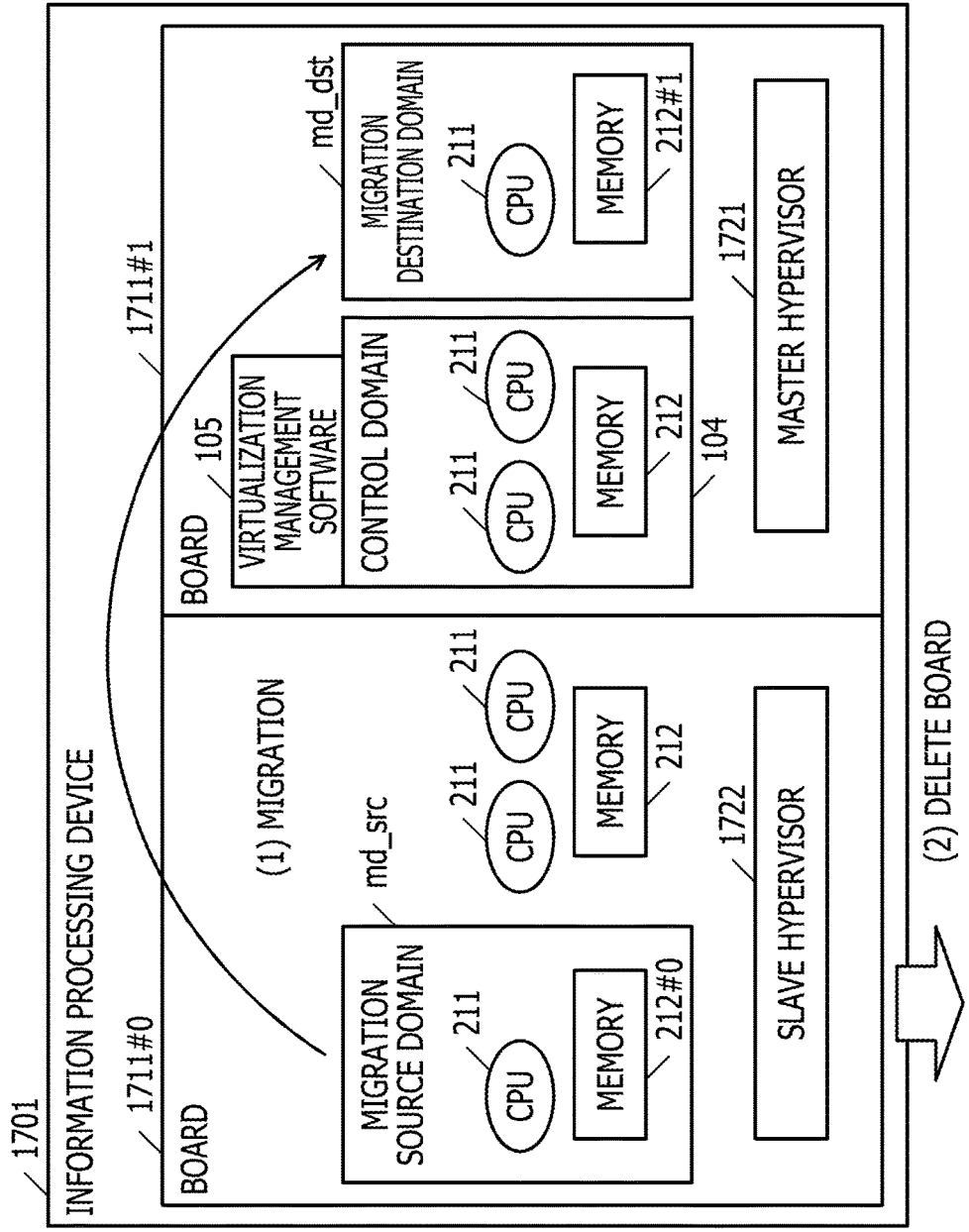
FIG. 18 is an explanatory diagram illustrating an example of an active board delete operation in the information processing device.

FIG. 18 is an explanatory diagram illustrating an example of an active board delete operation in the information processing device 1701. FIG. 18 illustrates an example of the active board delete operation including migration. Here, on the corresponding CPU 211 included in the board 1711#0 and on the corresponding CPU 211 included in the board 1711#1, the respective hypervisors 103 operate. In addition, regarding the CPUs 211 included in the board 1711#0 and the CPUs 211 included in the board 1711#1, on the CPUs of one of the board 1711#0 and the board 1711#1, the corresponding control domain 104 and the corresponding virtualization management software 105 operate. In FIG. 18, on the CPUs 211 included in the board 1711#1, the corresponding control domain 104 and the corresponding virtualization management software 105 operate.

In addition, the corresponding hypervisor 103 in the board 1711#1 is defined as a master hypervisor 1721, and the corresponding hypervisor 103 in the board 1711#0 is defined as a slave hypervisor 1722. In the second embodiment, it is assumed that the migration source domain md_src executed on the slave hypervisor 1722 is migrated to the migration destination domain md_dst executed on the master hypervisor 1721. Here, the migration source domain md_src uses a memory 212#0 in the board 1711#0, and a memory 212#1 in the board 1711#1 is secured for the migration destination domain md_dst.

As an operation illustrated in (1) in FIG. 18, the information processing device 1701 migrates the migration source domain md_src as the migration destination domain md_dst. In addition, after completion of the migration, as an operation illustrated in (2) in FIG. 18, an administrator of the information processing device 1701 deletes the board 1711#0.

Next, an example of a migration sequence in the information processing device 1701 illustrated in FIG. 18 will be described by using FIG. 19.

Figure 19:
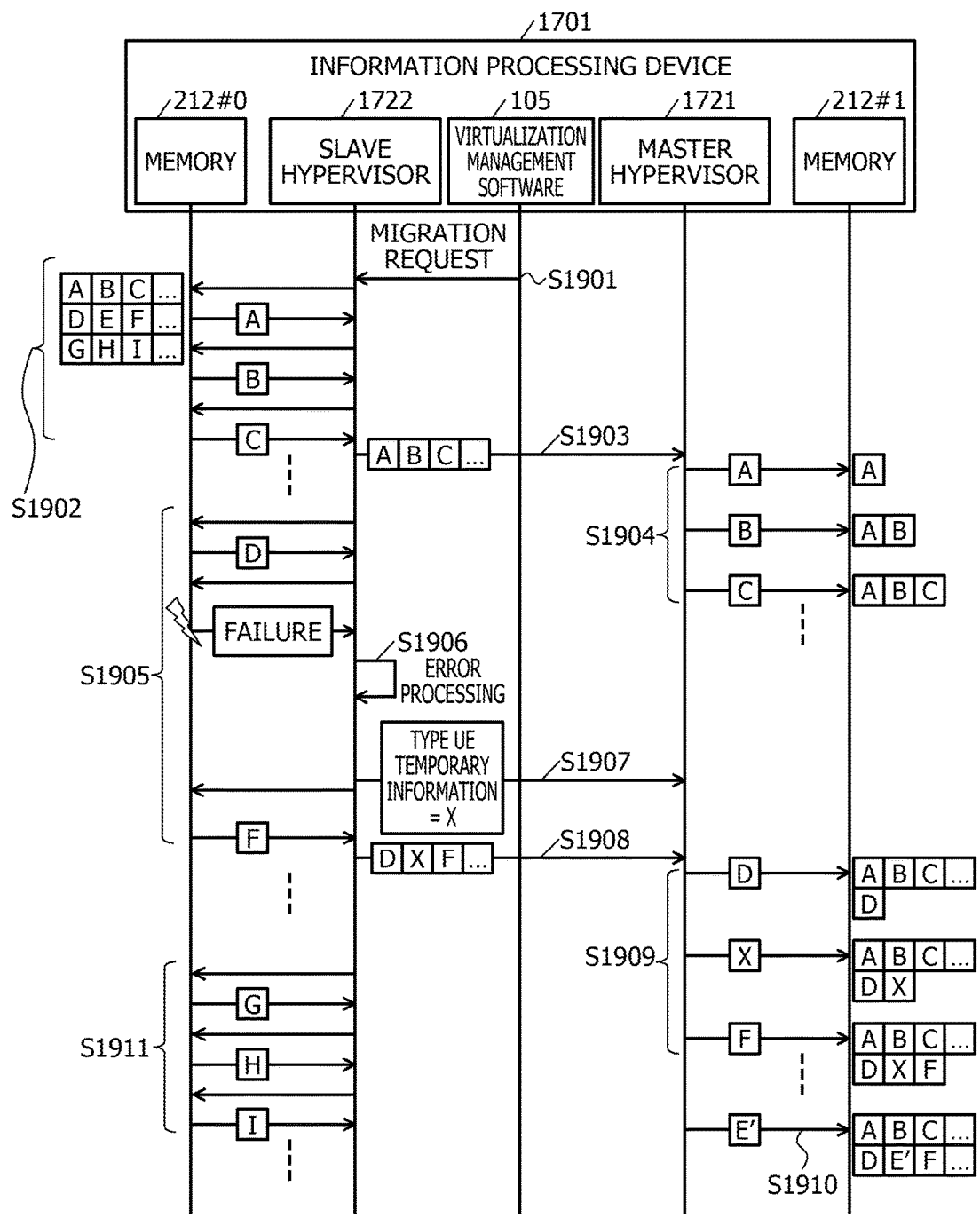
FIG. 19 is an explanatory diagram illustrating an example of a migration sequence in the information processing device.

FIG. 19 is an explanatory diagram illustrating an example of the migration sequence in the information processing device 1701. It is assumed that, in a state before performing migration, the memory 212#0 stores therein pieces of data of A, B, C, . . . , D, E, F, . . . , G, H, I, . . . to serve as the partial data 451. The virtualization management software 105 notifies the slave hypervisor 1722, which executes the migration source domain md_src, of a migration request (S1901).

The slave hypervisor 1722 that receives the migration request reads, from the memory 212#0, the pieces of data of A, B, C, . . . to serve as the partial data 451 of the migration source domain md_src (S1902). In addition, the slave hypervisor 1722 transmits, to the master hypervisor 1721, the pieces of data of A, B, C, . . . to serve as the partial data 451 (S1903). The master hypervisor 1721 that receives the pieces of data of A, B, C, . . . to serve as the partial data 451 writes, into the memory 212#1, the pieces of data of A, B, C, . . . to serve as the partial data 451 (S1904).

After S1903, the slave hypervisor 1722 subsequently reads, from the memory 212#0, the pieces of data of D, F, . . . to serve as the partial data 451 of the migration source domain md_src (S1905). In a case of detecting Trap due to a failure in the middle of S1905, as error processing, the slave hypervisor 1722 references the error status register and acquires the types of address, data size, and failure of a damaged memory (S1906).

In addition, the slave hypervisor 1722 transmits, to the master hypervisor 1721, the failure information 111 that serves as the type UE and in which the temporary information is the data of X (S1907). In addition, the slave hypervisor 1722 transmits, to the master hypervisor 1721, pieces of data of D, X, F, . . . to serve as the partial data 451 (S1908). Here, the data of X is temporary information corresponding to the data of E difficult to read.

The master hypervisor 1721 that receives the pieces of data of D, X, F, . . . to serve as the partial data 451 writes, into the memory 212#1, the pieces of data of D, X, F, . . . to serve as the partial data 451 (S1909). The master hypervisor 1721 that receives the failure information 111 writes the address of the data of X, identified by the failure information 111, into a register in which the UE of the CPU 211#1 is set. In addition, the CPU 211#1 performs a setting of hardware so that Trap is raised in a case where the address of the data of X is accessed (S1910).

After S1908, the slave hypervisor 1722 subsequently reads, from the memory 212#0, the pieces of data of G, H, I, . . . to serve as the partial data 451 of the migration source domain md_src (S1911). After that, the slave hypervisor 1722 reads, from the memory, the partial data 451 of the migration source domain md_src until the entire data of the migration source domain md_src is transmitted to the master hypervisor 1721.

Since a flowchart in the second embodiment is approximately the same as the corresponding flowchart in the first embodiment, the description and the illustration thereof will be omitted.

Next, whether or not to allow an operation of a domain to be continued for each of memory usage states at the time of performing migration by using the first or second embodiment will be described by using FIG. 20.

FIG. 20 is an explanatory diagram illustrating whether or not to allow an operation of a domain to be continued for each of memory usage states. In FIG. 20, whether or not to allow an operation of a domain to be continued for each of usage states of the corresponding memory 212 allocated to the migration source domain md_src will be described.

The usage states of the corresponding memory 212 are individually classified into states of being currently used, being unused, and being unusable. The state of being currently used is a state in which a migration source domain, to which the corresponding memory 212 is allocated, is currently used. Specifically, as areas of a memory in the state of being currently used, as illustrated in FIG. 20, there are an area of (A) to be read hereafter and an area of (B) to be subjected to writing hereafter. The state of being unused is an area of (C) illustrated in FIG. 20 and is a state in which a migration source domain, to which the corresponding memory 212 is allocated, is not used. The state of being unusable is an area of (D) illustrated in FIG. 20 and is a state in which an error previously occurred on a memory and in which a migration source domain, to which the corresponding memory 212 is allocated, is set to being unusable.

Even if, at the time of the occurrence of a UE, the state of the corresponding memory is in any one of the states of being currently used, being unused, and being unusable, the information processing device according to the first or second embodiment is able to continue migration.

In addition, in a case where the migration destination domain md_dst overwrites temporary information written into an area in the state of being currently used, the temporary information written into the area in the state of being currently used is not read. Accordingly, even in a case where a duplicate copy of information of the area in the state of being currently used is made in the processing of migration, if the migration destination domain md_dst does not read the temporary information, a trouble does not occur.

Here, an area in the state of being currently used will be described by using a detailed example. It is assumed that the migration source domain md_src performs, for example, replacement processing for replacing the value of a first variable stored in the memory 212#A_2 and the value of a second variable stored in the memory 212#A_2 with each other. Furthermore, it is assumed that the migration source domain md_src performs the replacement processing by using a third variable in the memory 212#A_2 as a variable for saving a value. In addition, it is assumed that the value of the first variable is saved to the third variable, the value of the second variable is subsequently written into the first variable, and the value of the third variable is written into the second variable, thereby completing the replacement processing. Here, it is assumed that after the migration source domain md_src saves the value of the first variable to the third variable, migration is performed. Furthermore, it is assumed that, at the time of the migration, the value of the first variable includes a UE.

In this case, after the value of the first variable is saved to the third variable, writing processing is performed on the first variable at the time of the migration. Therefore, the first variable at the time of the migration is put into the area of (B) illustrated in FIG. 20, and the information processing device according to the first or second embodiment is able to continue the migration. In addition, by writing the value of the second variable into the first variable, the temporary information written into the first variable turns out to be overwritten. Since, in this way, the temporary information written into the first variable is not read after the migration, a trouble does not occur.

Regarding an area in the state of being unused, the migration destination domain md_dst initializes the area at the time of using it. In other words, the temporary information written into the area in the state of being unused is not read. Accordingly, even if a duplicate copy of information of the area in the state of being unused is made, a trouble does not occur.

In addition, since being unable to be used by the migration source domain md_src, an area in the state of being unusable becomes unable to be used by the migration destination domain md_dst. In other words, the temporary information written into the area in the state of being unusable is not read. Accordingly, even if a duplicate copy of information of the area in the state of being unusable is made, a trouble does not occur.

As described above, according to the information processing device 1701, the same advantage as that of the information processing device 101 may be obtained. In addition, by application to dynamic reconfiguration, a domain utilizing a memory, in which a failure of hardware occurs, is able to be migrated so as to utilize another normally functioning memory, and it becomes possible to replace a faulty component without stopping a business operation. It is assumed that a CPU on the board 1711#0 executes, for example, 20 domains. In addition, it is assumed that, at the time of migration, a UE due to a memory occurs in information of one domain included in the 20 domains. In this case, the corresponding CPU on board 1711#0 is able to migrate all the 20 domains. While, in the board 1711#1 serving as a migration destination, an operation of one domain in which the UE occurs is likely to be stopped, the remaining 19 domains are able to continue operations thereof.

In addition, in a case where information including an error difficult to error-correct is detected from a memory used by a domain scheduled to be transmitted to a migration destination, the information processing device notifies the migration destination of identification information for identifying that the error difficult to error-correct is an error that occurs in a migration source. From this, it is possible to suppress the occurrence of a trouble in an operation of a domain in a case where an error difficult to error-correct is detected at the time of migration of the domain.

Note that a preliminarily prepared program is executed by using a computer such as a personal computer or a workstation, thereby enabling the information processing method described in the present embodiment to be realized. The present information processing program is recorded in a computer-readable recording medium such as a hard disk, a flexible disk, a Compact Disc-Read Only Memory (CD-ROM), or a Digital Versatile Disk (DVD) and is read from the recording medium by a computer, thereby being executed. In addition, the present information processing program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the present invention. Although the embodiments of the present invention have been described in detail, it should be understood that the various changes, substitutions, and alterations could be made hereto without departing from the spirit and scope of the invention.

What is claimed is:

1. A system comprising:
a first device including a memory and a processor, the processor being coupled to the memory and configured to cause a virtual machine to operate; and
a second device including a memory and a processor, the processor being coupled to the memory, the second device being coupled to the first device, wherein
the processor of the first device is configured to
notify the second device of failure information indicating that data transported to the second device includes an error originated from the first device, in a case where the error is detected from a storage area in the first device, at the time of migration of the virtual machine to the second device, and
the processor of the second device is configured to
write, when receiving the failure information from the first device, a second identifier, whose value is different from that of a first identifier, into a memory of the second device while associating the second identifier with a second address of the memory in the second device, the second address being used as a copy destination of data indicated by the failure information, wherein the first identifier indicates that data in the second address includes an error originated from the second device, and the second identifier serves as an identifier indicating that data in the second address includes an error originated from the first device.

2. The system according to claim 1, wherein
the failure information notified to the second device includes a first address at which the error is detected,
the processor of the first device is configured to transport data associated with the first address to the second device,
the processor of the second device is configured to write, when receiving the failure information from the first device, the second identifier into the memory of the second device while associating the second identifier with the second address, the second address being used as a copy destination of the data associated with the first address.

3. The system according to claim 1, wherein the processor of the first device is configured to
generate the failure information when an uncorrectable error is detected from a storage area in the first device, the failure information indicating that data transported to the second device includes the uncorrectable error originated from the first device, and
notify the second device of the failure information.

4. The system according to claim 1, wherein the processor of the first device is configured to transmit, to the second device at the time of the migration of the virtual machine to the second device, currently processed information of software operated on the virtual machine, wherein the currently processed information is stored in the storage area that is allocated to the virtual machine and that is included in the memory of the first device.

5. The system according to claim 1, wherein the processor of the second device is configured to
delete the second identifier in a case of detecting that a write access occurs at the second address associated with the second identifier, and
interrupt software serving as a generation source of an read access in a case of detecting that the read access occurs at the second address associated with the second identifier.

6. An information processing device comprising:
a memory; and
a processor coupled to the memory and configured to cause a virtual machine to operate, and
notify another information processing device of failure information indicating that data transported to the other information processing device includes an error originated from the information processing device, in a case where the error is detected from a storage area in the information processing device, at the time of migration of the virtual machine to the other information processing device,
the failure information is configured to cause the another information processing device to write a second identifier, whose value is different from that of a first identifier, into a second memory of the another information processing device while associating the second identifier with a second address of the second memory in the another information processing device, the second address being used as a copy destination of data indicated by the failure information, and
the first identifier indicates that data in the second address includes an error originated from the another information processing device, and the second identifier serves as an identifier indicating that data in the second address includes an error originated from the information processing device.

7. The information processing device according to claim 6, wherein
the failure information notified to the other information processing device includes a first address at which the error is detected, and
the processor is configured to transport data associated with the first address to the other information processing device.

8. The information processing device according to claim 6, wherein at the time of the migration to the other information processing device, the processor is configured to notify the other information processing device of the failure information corresponding to the information including the error, and continue execution of the migration.

9. The information processing device according to claim 6, wherein the processor is configured to
generate the failure information when an uncorrectable error is detected from a storage area in the information processing device, the failure information indicating that data transported to the other information processing device includes the uncorrectable error originated from the information processing device, and
notify the other information processing device of the failure information.

10. The information processing device according to claim 6, wherein the processor is configured to transmit, to the other information processing device at the time of the migration of the virtual machine to the other information processing device, currently processed information of software operated on the virtual machine, wherein the currently processed information is stored in the storage area that is allocated to the virtual machine and that is included in the memory of the information processing device.

11. A non-transitory computer-readable medium for storing computer executable program that cause a processor to execute a process of migrating a virtual machine from a migration source to a migration target, the process comprising:
as a first process of the migration source in the process, notifying the migration target of failure information indicating that data transported to the migration target includes an error originated from the migration source,
as a second process of the migration target in the process, writing a second identifier, whose value is different from that of a first identifier, into a memory of the migration target while associating the second identifier with a second address of a memory in the migration target, the second address being to serve as a copy destination of the data indicated by the failure information, wherein the first identifier indicates that data in the second address includes an error originated from the migration target, and the second identifier serves as an identifier indicating that data in the second address includes an error originated from the migration source.

12. The non-transitory medium according to claim 11, wherein
the failure information notified to the migration target includes a first address at which the error is detected,
the first process comprises:
transporting data associated with the first address to the migration target,
the second process comprises:
writing, when receiving the failure information from the migration source, the second identifier into the memory of the migration target while associating the second identifier with the second address, the second address being used as a copy destination of the data associated with the first address.

13. The non-transitory medium according to claim 11, wherein the first process comprises:
generating the failure information when an uncorrectable error is detected from a storage area in the migration source, the failure information indicating that data transported to the migration target includes the uncorrectable error originated from the migration source, and
notifying the migration target of the failure information.

14. The non-transitory medium according to claim 11, wherein the first process comprises:
transmitting, to the migration target at the time of the migration of the virtual machine to the migration target, currently processed information of software operated on the virtual machine, wherein the currently processed information is stored in the storage area that is allocated to the virtual machine and that is included in the memory of the migration source.

15. The non-transitory medium according to claim 11, wherein the second process comprises:
deleting the second identifier in a case of detecting that a write access occurs at the second address associated with the second identifier, and
interrupt software serving as a generation source of an read access in a case of detecting that the read access occurs at the second address associated with the second identifier.

* * * * *